(12) United States Patent
Sun et al.

(10) Patent No.: US 10,289,361 B2
(45) Date of Patent: May 14, 2019

(54) PRINT MANAGEMENT DEVICE THAT MANAGES PRINT MANAGEMENT INFORMATION RELATED TO IMAGE FORMING APPARATUS, AND PRINTING SYSTEM INCLUDING PRINT MANAGEMENT DEVICE

(71) Applicant: Kyocera Document Solutions Inc., Osaka (JP)

(72) Inventors: Zhenyu Sun, Osaka (JP); Masafumi Sato, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/990,843

(22) Filed: May 29, 2018

(65) Prior Publication Data

US 2018/0341446 A1 Nov. 29, 2018

(30) Foreign Application Priority Data

May 29, 2017 (JP) ................................ 2017-105492
May 29, 2017 (JP) ................................ 2017-105497

(51) Int. Cl.
*H04N 1/04* (2006.01)
*G06F 3/12* (2006.01)

(52) U.S. Cl.
CPC .......... *G06F 3/1239* (2013.01); *G06F 3/1203* (2013.01); *G06F 3/126* (2013.01); *G06F 3/1238* (2013.01); *G06F 3/1292* (2013.01); *G06F 3/1228* (2013.01)

(58) Field of Classification Search
CPC ...... G06F 3/1239; G06F 3/1292; G06F 3/126; G06F 3/1238

USPC ......................................................... 358/1.15
See application file for complete search history.

(56) References Cited

U.S. PATENT DOCUMENTS

| | | | | |
|---|---|---|---|---|
| 2010/0309510 A1* | 12/2010 | Hansen | ................. | G06F 3/1203 358/1.15 |
| 2011/0242574 A1* | 10/2011 | Soriano | .............. | H04N 1/00363 358/1.14 |
| 2014/0218760 A1* | 8/2014 | Murata | ................. | G06F 3/1204 358/1.15 |
| 2014/0340717 A1* | 11/2014 | Meiyappan | ........ | H04N 1/32432 358/400 |

FOREIGN PATENT DOCUMENTS

JP  2012-194640 A  10/2012

* cited by examiner

*Primary Examiner* — Houshang Safaipour
(74) *Attorney, Agent, or Firm* — Hea Law PLLC

(57) ABSTRACT

A print management device includes a queue managing unit, a wireless communication unit, a data storage unit, and a data transmitting unit. The queue managing unit manages queues related to image forming apparatuses. The wireless communication unit communicates with a user terminal in a common wireless printing protocol. The wireless printing protocol does not require a driver individually corresponding to the image forming apparatuses. The data storage unit stores print data received by the wireless communication unit from the user terminal over the communications in the queues managed by the queue managing unit. The data transmitting unit takes out the print data from the queue to transmit the print data to the image forming apparatus related to the queue.

9 Claims, 21 Drawing Sheets

| Queue ID | Kind | Device ID | User ID |
|---|---|---|---|
| Q001 | Usual | MFP001 | USER001 |
| Q002 | Tandem | MFP001<br>MFP002 | USER001 |
| Q003 | Tandem | MFP002<br>MFP003 | USER001<br>USER002 |
| Q004 | Tandem | MFP001<br>MFP002<br>MFP003 | USER002<br>USER003 |
| Q005 | Usual | MFP003 | USER003 |
| ⋮ | ⋮ | ⋮ | ⋮ |

PRINT MANAGEMENT DEVICE THAT MANAGES PRINT MANAGEMENT INFORMATION RELATED TO IMAGE FORMING APPARATUS, AND PRINTING SYSTEM INCLUDING PRINT MANAGEMENT DEVICE

INCORPORATION BY REFERENCE

This application is based upon, and claims the benefit of priority from, corresponding Japanese Patent Application Nos. 2017-105492 and 2017-105497, each filed in the Japan Patent Office on May 29, 2017, the entire contents of each of which are incorporated herein by reference.

BACKGROUND

Unless otherwise indicated herein, the description in this section is not prior art to the claims in this application and is not admitted to be prior art by inclusion in this section.

There has been known a typical printing system that includes a user terminal, which transmits print data, an image forming apparatus, which performs printing based on the print data, and a print management device, which manages queues related to the image forming apparatuses. The typical printing system needs a driver individually corresponding to the image forming apparatuses.

SUMMARY

A print management device according to a first aspect of the disclosure includes a queue managing unit, a wireless communication unit, a data storage unit, and a data transmitting unit. The queue managing unit manages queues related to image forming apparatuses. The wireless communication unit communicates with a user terminal in a common wireless printing protocol. The wireless printing protocol does not require a driver individually corresponding to the image forming apparatuses. The data storage unit stores print data received by the wireless communication unit from the user terminal over the communications in the queues managed by the queue managing unit. The data transmitting unit takes out the print data from the queue to transmit the print data to the image forming apparatus related to the queue.

A printing system according to a second aspect of the disclosure includes a user terminal, an image forming apparatus, and a print management device. The user terminal transmits print data. The image forming apparatus performs printing based on the print data. The print management device manages print management information related to the image forming apparatus. The user terminal includes a data transmitting unit and a transmission notifying unit. The data transmitting unit transmits the print data to the image forming apparatus related to the print management information managed by the print management device without via the print management device. The transmission notifying unit notifies the print management device of the transmission of the print data to the image forming apparatus by the data transmitting unit. The print management device includes a print confirming unit and a print amount managing unit. The print confirming unit performs confirmation of completion of the printing based on the print data to the image forming apparatus when the transmission of the print data to the image forming apparatus is notified from the user terminal. The print amount managing unit manages an amount of printing based on a result of the confirmation by the print confirming unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
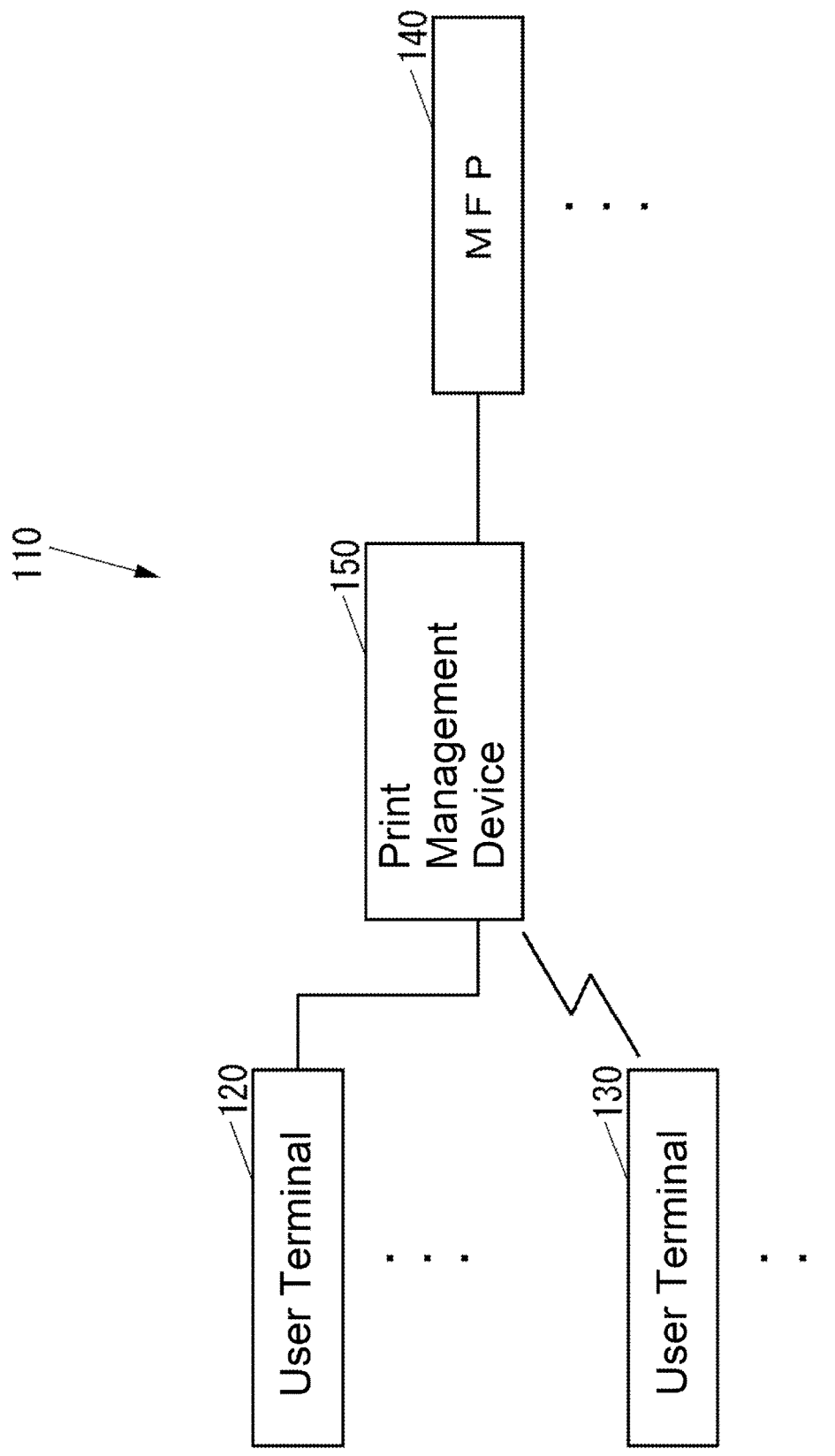
FIG. 1 shows a block diagram illustrating a printing system according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. First Embodiment

The following describes the first embodiment of the disclosure with reference to the accompanying drawings.

First, a description will be given of a configuration of a printing system 110 according to the first embodiment.

FIG. 1 shows a block diagram of the printing system 110 according to the first embodiment.

As illustrated in FIG. 1, the printing system 110 includes: a user terminal 120 that transmits print data described in page description language such as a printer control language (PCL); a user terminal 130 that transmits the print data described in the page description language; a multifunction peripheral (MFP) 140 as an image forming apparatus that performs printing based on the print data, and a print management device 150 that manages queues related to the MFPs.

The user terminal 120 and the print management device 150 are communicable with one another via a network such as the Internet or a local area network (LAN). The user terminal 130 and the print management device 150 are communicable with one another via a wireless LAN. The MFP 140 and the print management device 150 are communicable with one another via a network.

The printing system 110 can include at least one user terminal that has a similar configuration with the user terminal 120 besides the user terminal 120. Similarly, the printing system 110 can include at least one user terminal that has a similar configuration with the user terminal 130 besides the user terminal 130. Similarly, the printing system 110 can include at least one MFP that has a similar configuration with the MFP 140 besides the MFP 140.

Figure 2:
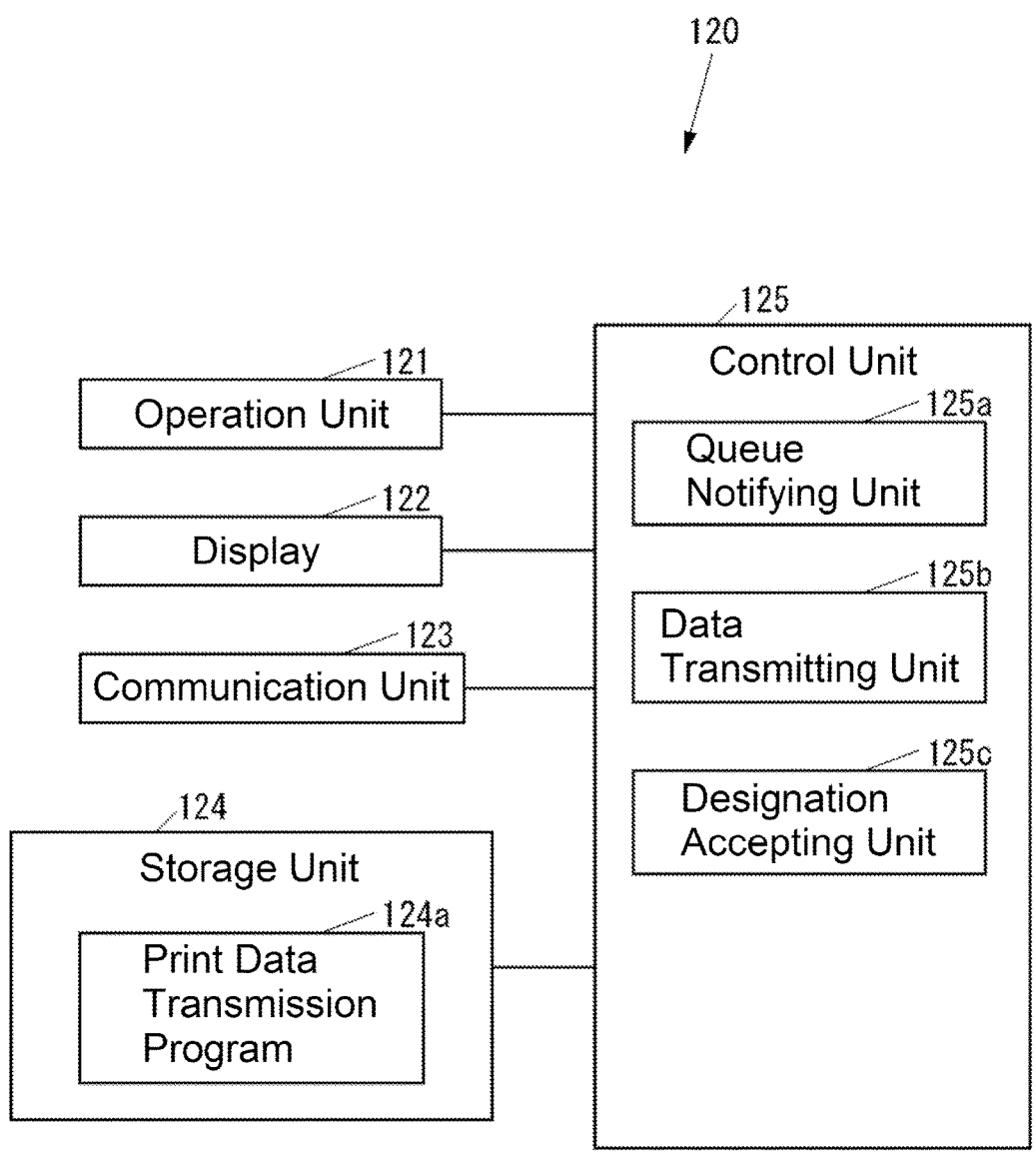
FIG. 2 shows a block diagram illustrating one user terminal among two user terminals according to the first embodiment.

FIG. 2 shows a block diagram of the user terminal 120 according to the first embodiment.

As illustrated in FIG. 2, the user terminal 120 includes: an operation unit 121 as an input device such as a keyboard or a computer mouse with which various kinds of operations are input; a display 122 as a display device such as a liquid crystal display (LCD) that displays various kinds of information; a communication unit 123 as a communication device that communicates with an external device via the network, or directly via wired or wireless connection without via the network; a storage unit 124 as a non-volatile storage device such as a semiconductor memory or a hard disk drive (HDD) that stores various kinds of information; and a control unit 125 that controls the whole user terminal 120. The user terminal 120 is, for example, a computer such as a smart phone, a tablet, or a personal computer (PC).

The storage unit 124 stores a print data transmission program 124a to transmit the print data. The print data transmission program 124a may be installed into the user terminal 120 at a production stage of the user terminal 120, may be additionally installed into the user terminal 120 from an external storage medium such as a compact disk (CD), a digital versatile disk (DVD), a universal serial bus (USB) memory, or may be additionally installed into the user terminal 120 from the network.

The control unit 125 includes, for example, the following: a central processing unit (CPU); a read-only memory (ROM) that stores programs and various kinds of data; and a random-access memory (RAM) used as a work area of the CPU. The CPU executes the programs stored in the ROM or the storage unit 124.

The control unit 125 executes the print data transmission program 124a to achieve a queue notifying unit 125a that notifies queues managed by the print management device 150 (see FIG. 1), a data transmitting unit 125b that transmits the print data, and a designation accepting unit 125c that accepts a designation of any of the queues notified by the queue notifying unit 125a.

Kinds of the queues managed by the print management device 150 include a usual queue related to one MFP and can spool the print data and a tandem queue to which a plurality of MFPs for which the print data can be assigned are related and can spool the print data.

Figure 3:
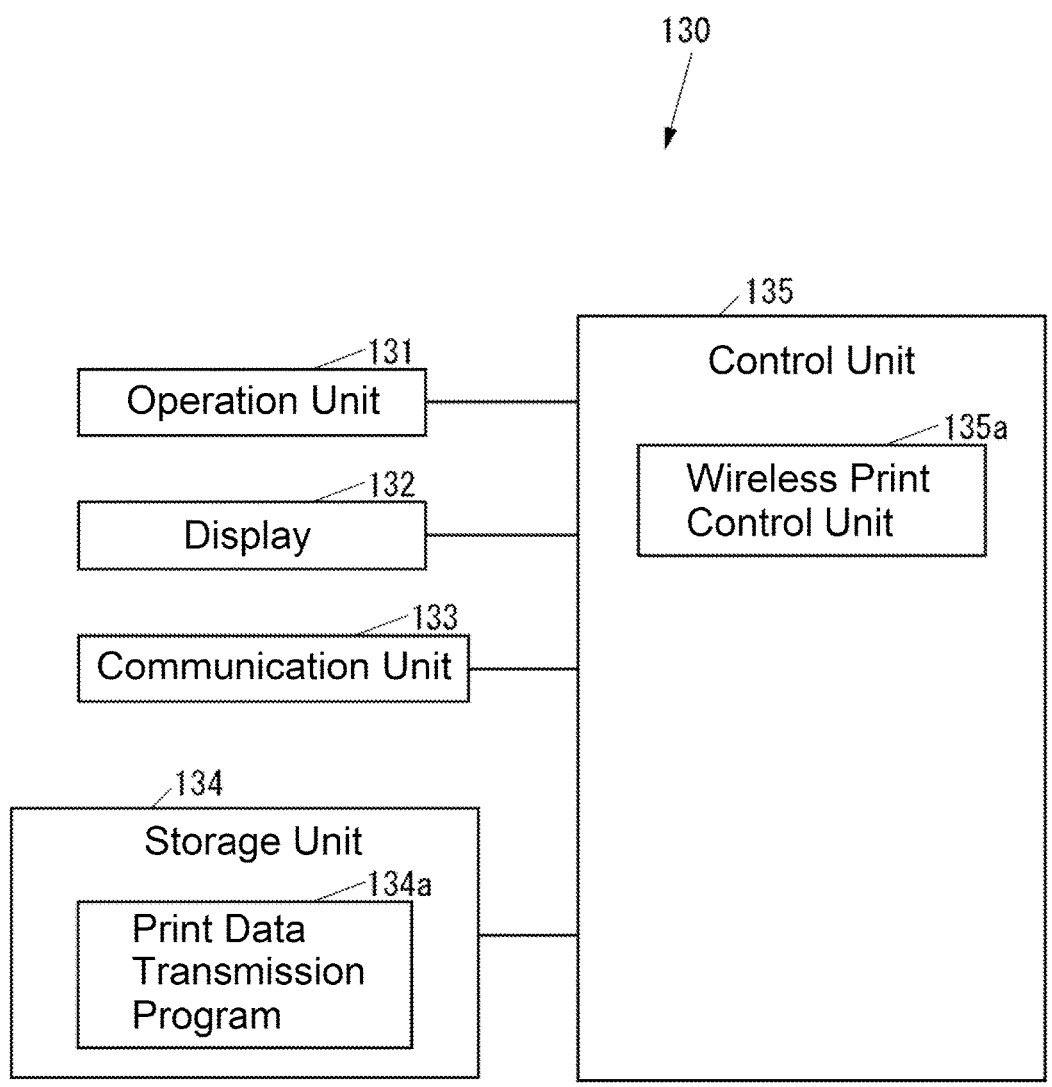
FIG. 3 shows a block diagram illustrating a user terminal other than the user terminal illustrated in FIG. 2 among the two user terminals according to the first embodiment.

FIG. 3 shows a block diagram of the user terminal 130 according to the first embodiment.

As illustrated in FIG. 3, the user terminal 130 includes: an operation unit 131 as an input device such as a keyboard or a computer mouse with which various kinds of operations are input; a display 132 as a display device such as an LCD that displays various kinds of information; a communication unit 133 as a communication device that communicates with an external device via the network, or directly via wired or wireless connection without via the network; a storage unit 134 as a non-volatile storage device such as a semiconductor memory or a HDD that stores various kinds of information; and a control unit 135 that controls the whole user terminal 130. The user terminal 130 is, for example, a computer such as a smart phone, a tablet, or a PC.

The storage unit 134 stores a print data transmission program 134a to transmit the print data. The print data transmission program 134a may be installed into the user terminal 130 at a production stage of the user terminal 130, may be additionally installed into the user terminal 130 from an external storage medium such as a CD, a DVD, or a USB memory, or may be additionally installed into the user terminal 130 from the network.

The control unit 135 includes, for example, a CPU, a ROM that stores programs and various kinds of data, and a RAM used as a work area for the CPU. The CPU executes the programs stored in the ROM or the storage unit 134.

The control unit 135 executes the print data transmission program 134a to achieve a wireless print control unit 135a that controls communications with an external device in a common wireless printing protocol (hereinafter referred to as "wireless printing protocol") that does not require a driver individually corresponding to a specific MFP. Here, the wireless printing protocol includes, for example, AirPrint (registered trademark), Mopria (registered trademark), and Google (registered trademark) Cloud Print.

Figure 4:
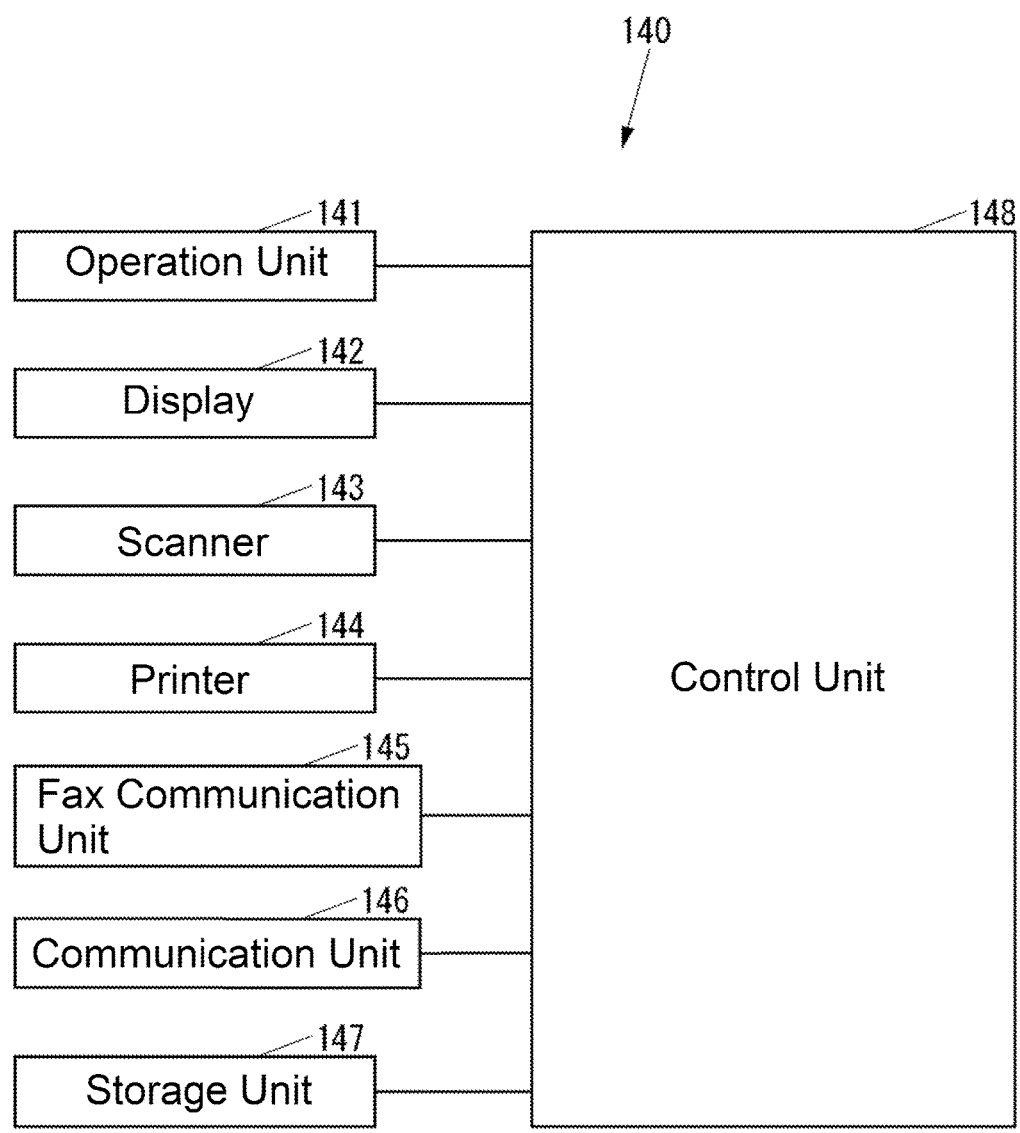
FIG. 4 shows a block diagram illustrating an MFP according to the first embodiment.

FIG. 4 shows a block diagram of the MFP 140 according to the first embodiment.

As illustrated in FIG. 4, the MFP 140 includes: an operation unit 141 as an input device such as a button with which various kinds of operations are input; a display 142 as a display device such as an LCD that displays various kinds of information; a scanner 143 as a reading device that reads an image from a document; a printer 144 as a print device that prints an image to a recording medium such as a paper sheet; a fax communication unit 145 as a fax device that performs fax communications with an external facsimile device (not illustrated) via a communication line such as a dial-up line; a communication unit 146 as a communication device that communicates with an external device via the network or directly via wired or wireless connection without via the network; a storage unit 147 as a non-volatile storage device such as a semiconductor memory or an HDD that stores various kinds of information; and a control unit 148 that controls the whole MFP 140.

The control unit 148 includes, for example, a CPU, a ROM that stores programs and various kinds of data, and a RAM used as a work area for the CPU. The CPU executes the programs stored in the ROM or the storage unit 147.

Figure 5:
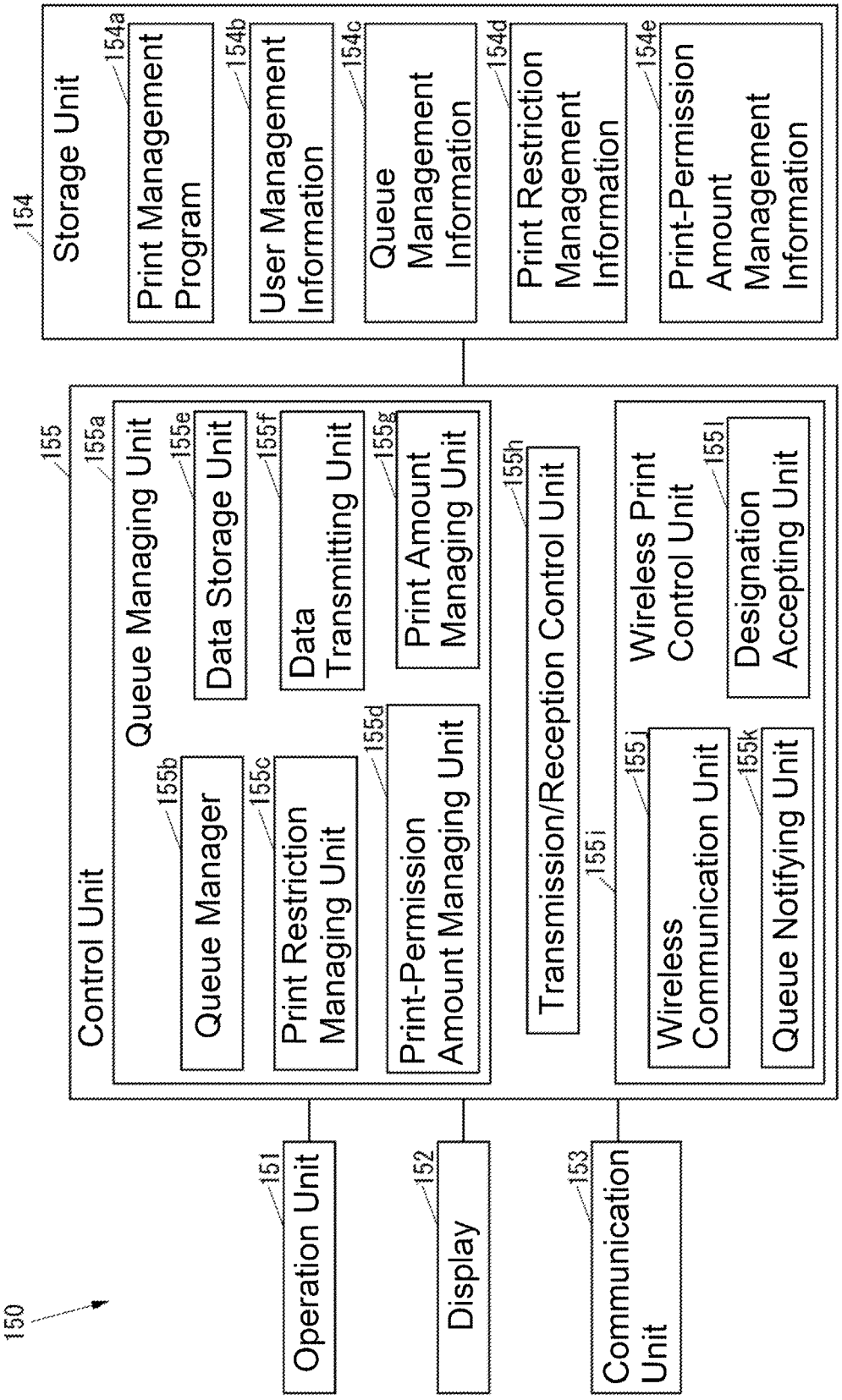
FIG. 5 shows a block diagram of a print management device according to the first embodiment.

FIG. 5 shows a block diagram of the print management device 150 according to the first embodiment.

As illustrated in FIG. 5, the print management device 150 includes: an operation unit 151 as an input device such as a keyboard or a computer mouse with which various kinds of operations are input; a display 152 as a display device such as an LCD that displays various kinds of information; a communication unit 153 as a communication device that communicates with an external device via the network, or directly via wired or wireless connection without via the network; a storage unit 154 as a non-volatile storage device such as a semiconductor memory or a HDD that stores various kinds of information; and a control unit 155 that controls the whole print management device 150. The print management device 150 is, for example, a computer such as a PC.

The storage unit 154 stores a print management program 154a to manage the queues. The print management program 154a may be installed into the print management device 150 at a production stage of the print management device 150, may be additionally installed into the print management device 150 from an external storage medium such as a USB memory, a CD, or a DVD, or may be additionally installed into the print management device 150 from the network.

The storage unit 154 stores user management information 154b that shows authentication information to authenticate a user by users. Here, the authentication information, for example, may be a combination of a user ID as identification information of the user and a password or may be a personal identification number (PIN). Various kinds of information included in the user management information 154b can be added, changed, or deleted by an administrator.

The storage unit 154 stores queue management information 154c to manage the queues.

Figure 6:
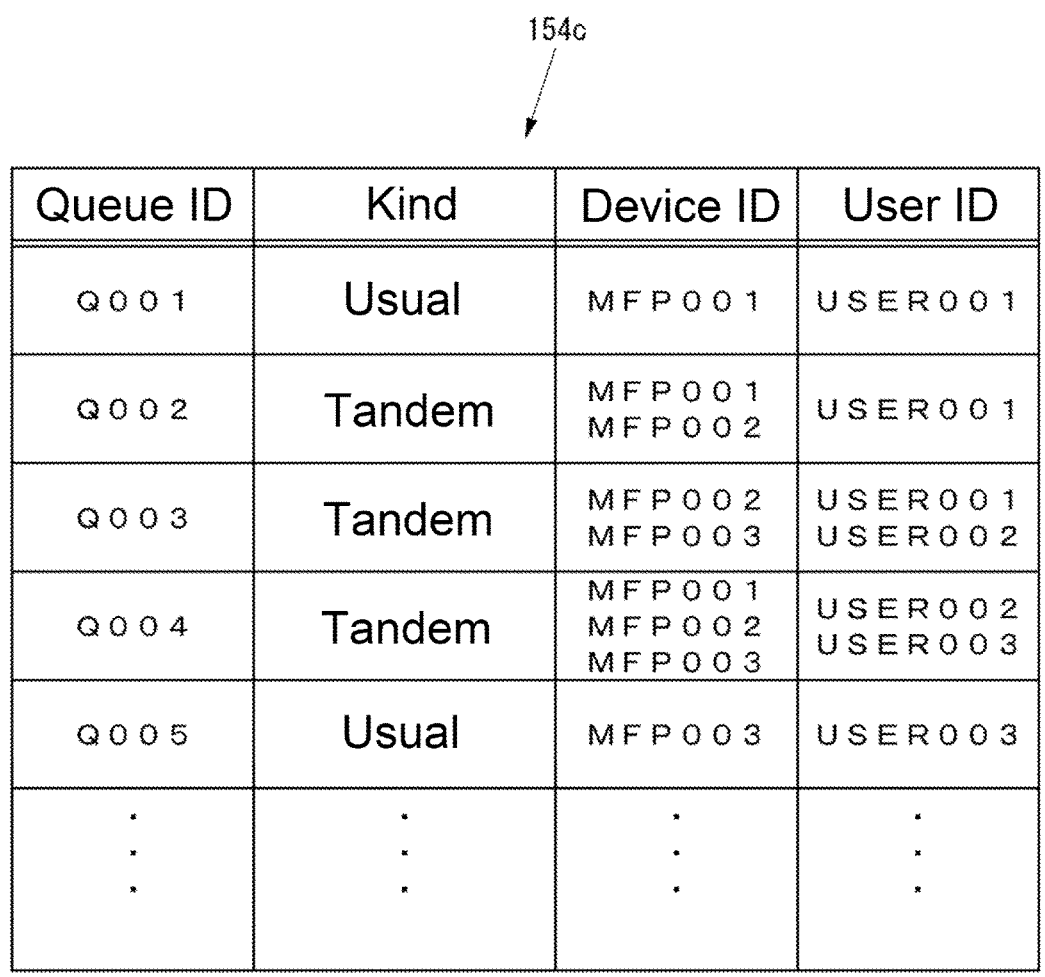
FIG. 6 shows exemplary queue management information according to the first embodiment.

FIG. 6 shows the exemplary queue management information 154c according to the first embodiment.

As illustrated in FIG. 6, the queue management information 154c is information showing queue IDs as identification information of the queues, the kinds of the queues, device IDs as identification information of the MFPs related to the queues, and user IDs of the users related to the queues by queues. The various kinds of information included in the queue management information 154c can be added, changed, or deleted by the administrator.

As illustrated in FIG. 5, the storage unit 154 stores print restriction management information 154d to manage print restrictions as restrictions on print functions to the user. The print restriction management information 154d is information showing the print restrictions by users. The print restrictions include, for example, inhibition of color printing, inhibition of single-side printing, and inhibition of printing without aggregations. The various kinds of information included in the print restriction management information 154d can be added, changed, or deleted by the administrator.

The storage unit 154 stores print-permission amount management information 154e to manage a print-permission amount as an amount of printing permitted to the user. The print-permission amount management information 154e is information showing an amount of print upper limit, which indicates the amount of the upper limit of the printing permitted to the user, an amount of printing performed by the user, and the print-permission amount, which is found by subtracting the amount of printing from the amount of print upper limit, by users. The amount of printing is, for example, used as a criterion to settle an amount of money charged to the user. The various kinds of information included in the print-permission amount management information 154e can be added, changed, or deleted by the administrator.

The control unit 155 includes, for example, a CPU, a ROM that stores programs and various kinds of data, and a RAM used as a work area for the CPU. The CPU executes the programs stored in the ROM or the storage unit 154.

The control unit 155 executes the print management program 154a to achieve a queue managing unit 155a that manages the queues, a transmission/reception control unit 155h that controls transmission/reception of the information to the external device, and a wireless print control unit 155i that controls the communications with the external device in the wireless printing protocol.

The queue managing unit 155a achieves a queue manager 155b that manage the queues, a print restriction managing unit 155c that manages the print restrictions, a print-permission amount managing unit 155d that manages the print-permission amount, a data storage unit 155e that stores the print data received from the user terminal in the queue managed by the queue manager 155b, a data transmitting unit 155f that takes out the print data from the queue and transmits the print data to the MFP related to the queue, and a print amount managing unit 155g that manages the amount of printing to the printing by the MFP.

The wireless print control unit 155i achieves a wireless communication unit 155j that communicates with the user terminal in the wireless printing protocol, a queue notifying unit 155k that notifies the user terminal of the queue managed by the queue manager 155b over communications in the wireless printing protocol, and a designation accepting unit 155l that accepts a designation of any of the queues notified by the queue notifying unit 155k from the user terminal over communications in the wireless printing protocol.

Next, a description will be given of operations of the printing system 110.

First, the following describes the operations of the printing system 110 that performs the printing using the user terminal 120.

The transmission/reception control unit 155h is always interposed for the transmission/reception of information between the user terminal 120 and the queue managing unit 155a. However, the following omits the explanation on the operations of the transmission/reception control unit 155h.

First, the following describes the operations of the printing system 110 when the user terminal 120 displays a list of the queues (hereinafter referred to as "queue list").

Figure 7:
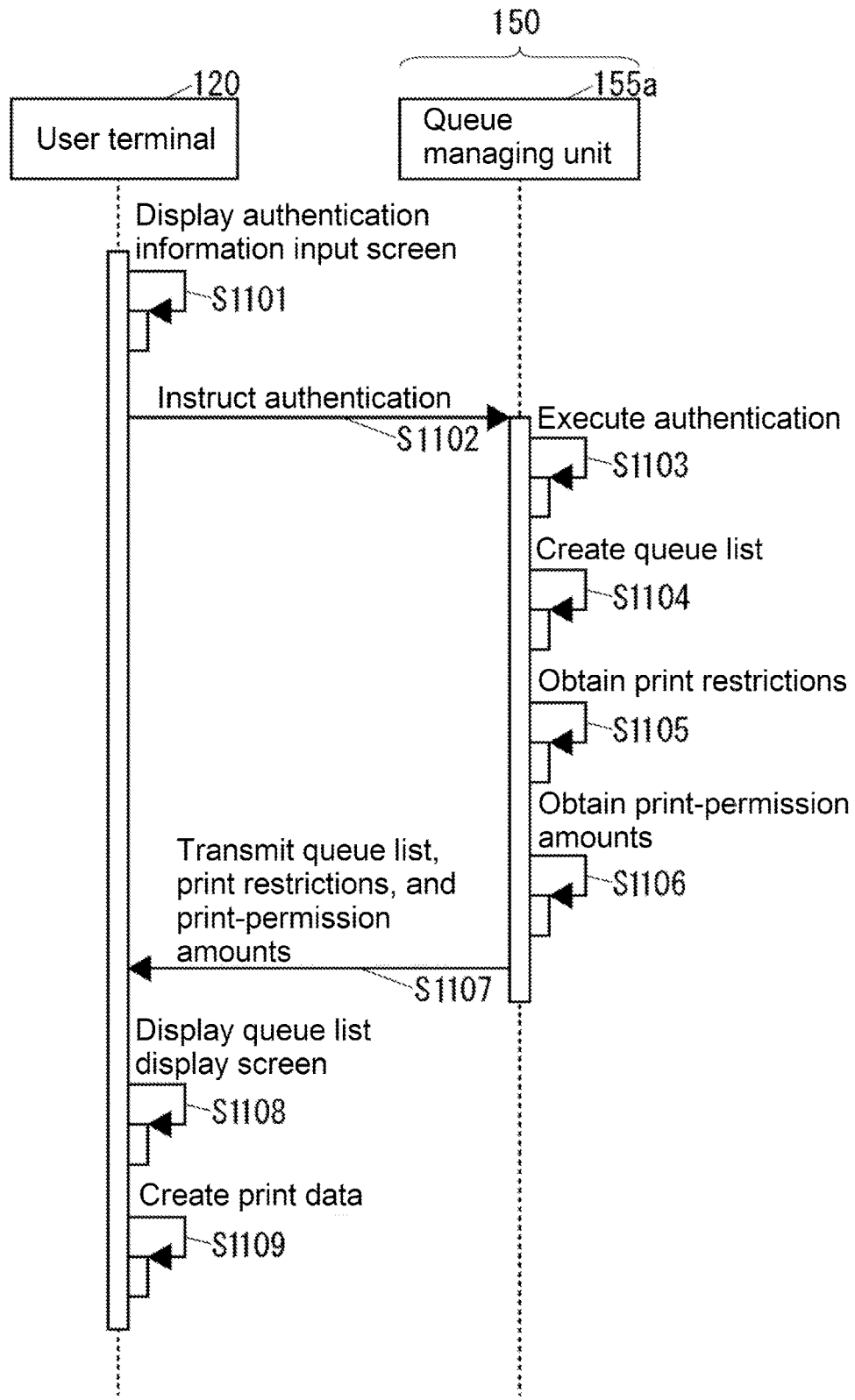
FIG. 7 shows a sequence diagram of operations of a printing system when the user terminal according to the first embodiment displays a queue list.

FIG. 7 shows a sequence diagram of the operations of the printing system 110 when the user terminal 120 according to the first embodiment displays the queue list.

When the performance of the printing is instructed via the operation unit 121 in the user terminal 120, as illustrated in FIG. 7, the queue notifying unit 125a in the user terminal 120 displays an authentication information input screen to which the authentication information of the user is input on the display 122 (Step S1101). Accordingly, the user can input the authentication information in the authentication information input screen via the operation unit 121.

When the authentication information is input to the authentication information input screen, the queue notifying unit 125a transmits the input authentication information to the print management device 150 to instruct the print management device 150 to perform the authentication of the user (Step S1102).

When the user terminal 120 instructs the authentication of the user, the queue manager 155b in the print management device 150 performs the authentication of the user based on the authentication information transmitted from the user terminal 120 and the user management information 154b (Step S1103).

When the authentication at Step S1103 succeeds and the user is identified, the queue manager 155b creates the queue list, which shows combinations of the queue IDs, the kinds of the queues, and the device IDs related to the queues of all queues related to the user IDs based on the user IDs of the users identified by the authentication at Step S1103 and the queue management information 154c (Step S1104).

Next, the print restriction managing unit 155c in the print management device 150 obtains the print restrictions of these users based on the users identified by the authentication at Step S1103 and the print restriction management information 154d (Step S1105).

Next, the print-permission amount managing unit 155d in the print management device 150 obtains the print-permission amounts for the users based on the users identified by the authentication at Step S1103 and the print-permission amount management information 154e (Step S1106).

Next, the queue manager 155b in the print management device 150 transmits the queue list created at Step S1104, the print restrictions obtained at Step S1105, and the print-permission amounts obtained at Step S1106 to the user terminal 120 (Step S1107).

When the queue list is transmitted from the print management device 150, the queue notifying unit 125a in the user terminal 120 displays a queue list display screen 160 (see FIG. 8), which shows the transmitted queue list, on the display 122 (Step S1108).

Figure 8:
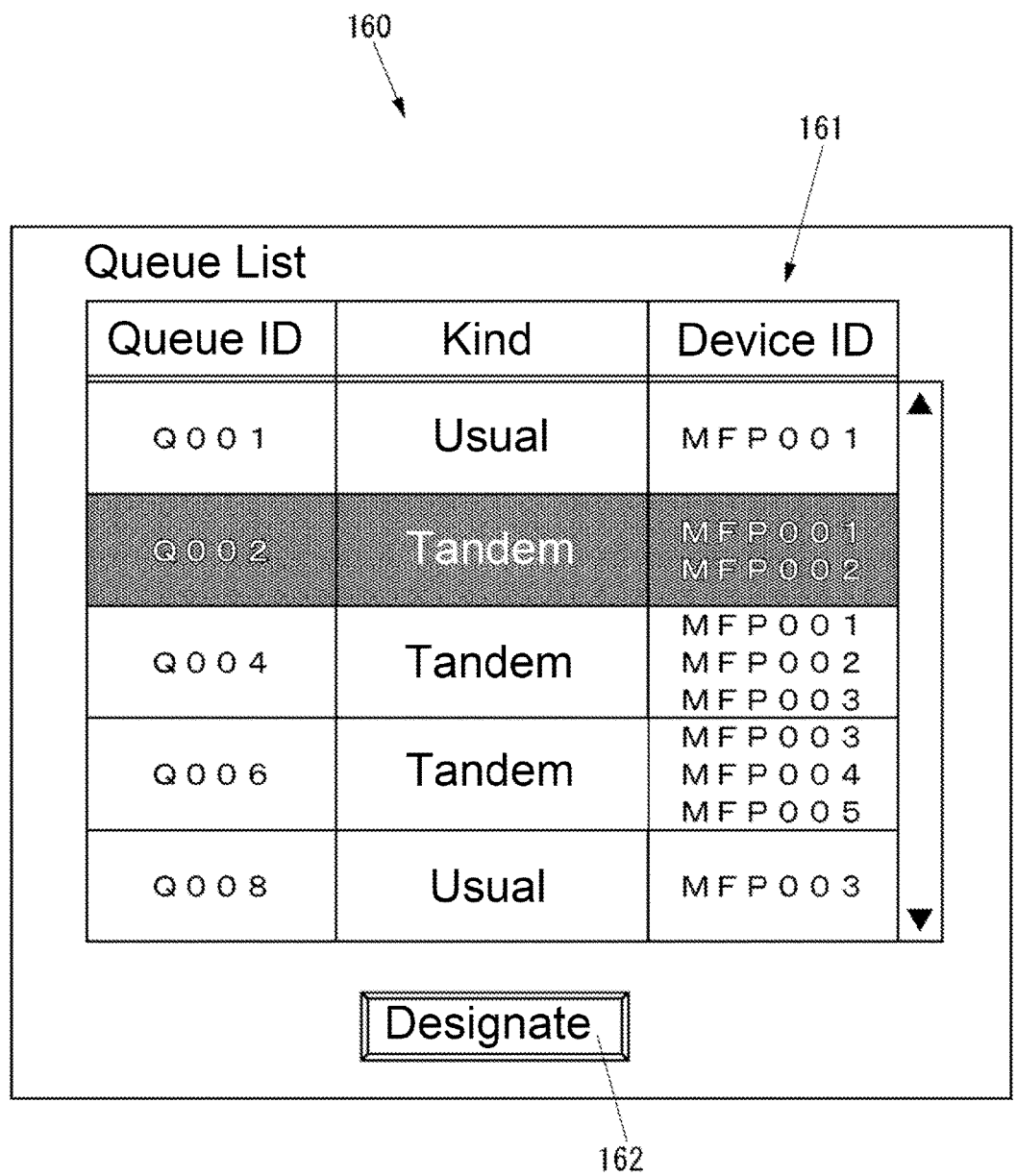
FIG. 8 shows an exemplary queue list display screen displayed in the operation illustrated in FIG. 7.

FIG. 8 shows the exemplary queue list display screen 160. As illustrated in FIG. 8, the queue list display screen 160 includes a queue list 161 and a designation button 162 to accept the designation of the queue selected in the queue list 161. Any one of queues is selectable from the queue list 161 and a row of the selected queue is displayed in black-and-white inversion. In the queue list 161, the queues can be sorted by the queue IDs or the kinds.

As illustrated in FIG. 7, the data transmitting unit 125b in the user terminal 120 creates print data that suits the print restrictions transmitted at Step S1107 and does not exceed the print-permission amount transmitted at Step S1107 (Step S1109).

Next, the following describes the operations of the printing system 110 when the queue is designated in the queue list 161 displayed on the user terminal 120.

Figure 9:
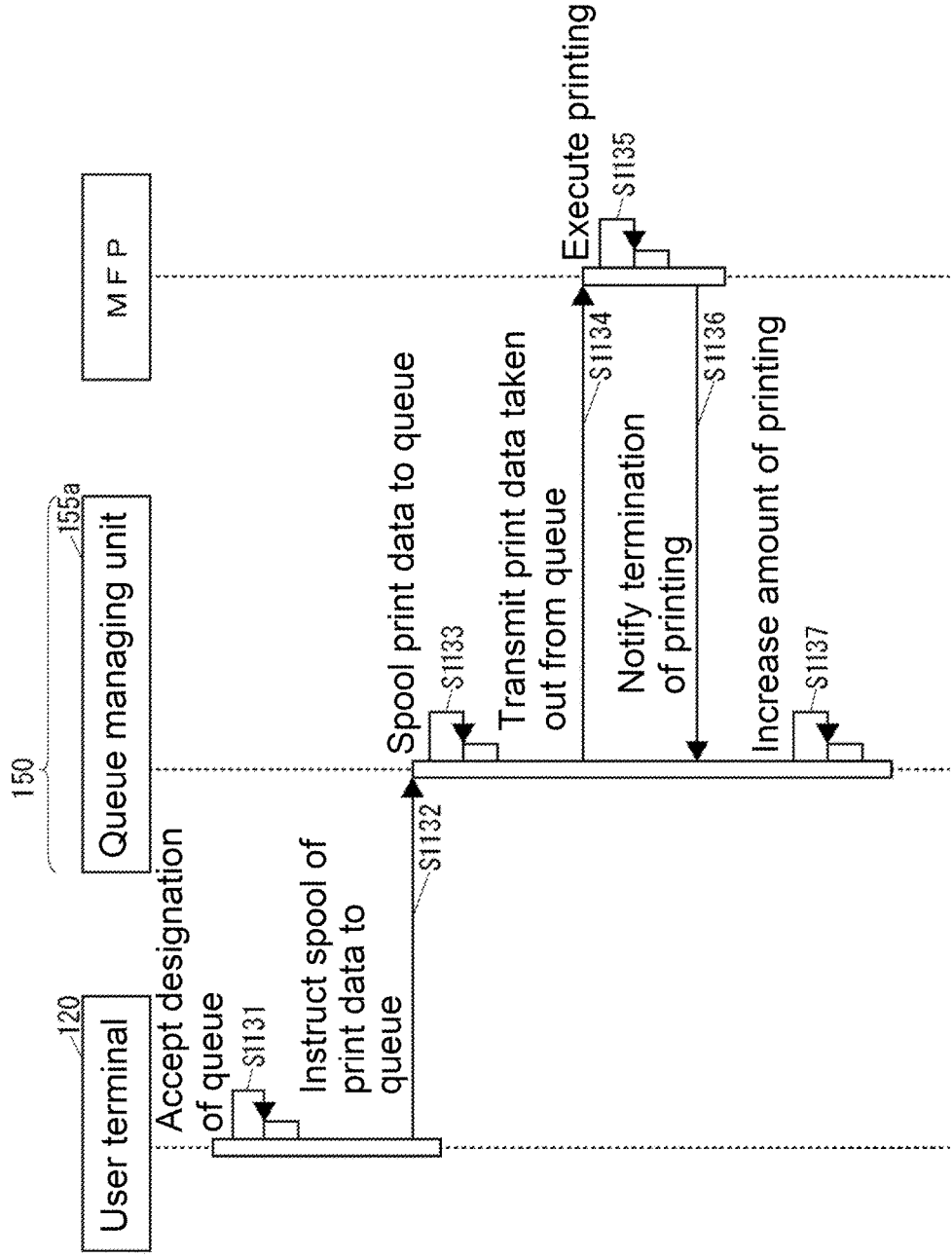
FIG. 9 shows a sequence diagram of operations of the printing system when a queue is designated in the queue list displayed on the user terminal according to the first embodiment.

FIG. 9 shows a sequence diagram of the operations of the printing system 110 when the queue is designated in the queue list 161 displayed on the user terminal 120 according to the first embodiment.

Pressing the designation button 162 while any one of the queues is selected in the queue list 161 on the queue list display screen 160, the designation accepting unit 125c in the user terminal 120 accepts the designation of the queue selected in the queue list 161 as illustrated in FIG. 9 (Step S1131).

Next, the data transmitting unit 125b transmits the print data created at Step S1109 and the queue ID of the queue accepted at Step S1131 to the print management device 150 to instruct the print management device 150 to spool the print data to the queue (Step S1132).

When the spool of the print data to the queue is instructed at Step S1132, the data storage unit 155e in the print management device 150 stores the print data transmitted at Step S1132 to the queue corresponding to the queue ID transmitted at Step S1132 among the queues managed by the queue manager 155b (Step S1133).

When the print data stored in the queue at Step S1133 has a turn to be taken out, the data transmitting unit 155f in the print management device 150 takes out the print data from this queue and transmits the print data to the MFP related to this queue in the queue management information 154c (Step S1134). When the queue storing the print data at Step S1133 is the tandem queue, the data transmitting unit 155f transmits the print data to the most appropriate MFP among the MFPs related to this tandem queue in the queue management information 154c. Here, the most appropriate MFP is, for example, an MFP with a high possibility of the earliest termination of the performance of printing based on this print data among the MFPs related to this tandem queue in the queue management information 154c. The MFP with the high possibility of the earliest termination of the performance of printing is, for example, an MFP with the least count of print data standing by for performance of printing among the MFPs related to this tandem queue in the queue management information 154c. The data transmitting unit 155f may make an inquiry for information required to settle the most appropriate MFP to the MFP to acquire the information.

When the print data is transmitted at Step S1134, the control unit in the MFP performs the printing by a printer based on the transmitted print data (Step S1135). When the printing performed at Step S1135 terminates, the control unit notifies the print management device 150 of the termination of the printing (Step S1136).

When the termination of the printing is notified at Step S1136, the print amount managing unit 155g in the print management device 150 increases the amount of printing of the user identified by the authentication at Step S1103 in the print-permission amount management information 154e according the amount of printing performed at Step S1135 (Step S1137). Here, after increasing the amount of printing, the print amount managing unit 155g also changes the print-permission amount by subtracting the amount of printing from the amount of print upper limit.

Next, the following describes the operations of the printing system 110 that performs the printing using the user terminal 130.

The wireless print control unit 155i is always interposed for the transmission/reception of information between the user terminal 130 and the queue managing unit 155a. The transmission/reception control unit 155h is always interposed for the transmission/reception of information between the wireless print control unit 155i and the queue managing unit 155a. However, the following omits the explanation on the operations of the transmission/reception control unit 155h. While the wireless communication unit 155j performs all communications between the user terminal 130 and the wireless print control unit 155i over the communications in the wireless printing protocol, the following omits the detailed explanation.

First, the following describes the operations of the printing system 110 when the user terminal 130 displays the queue list.

Figure 10:
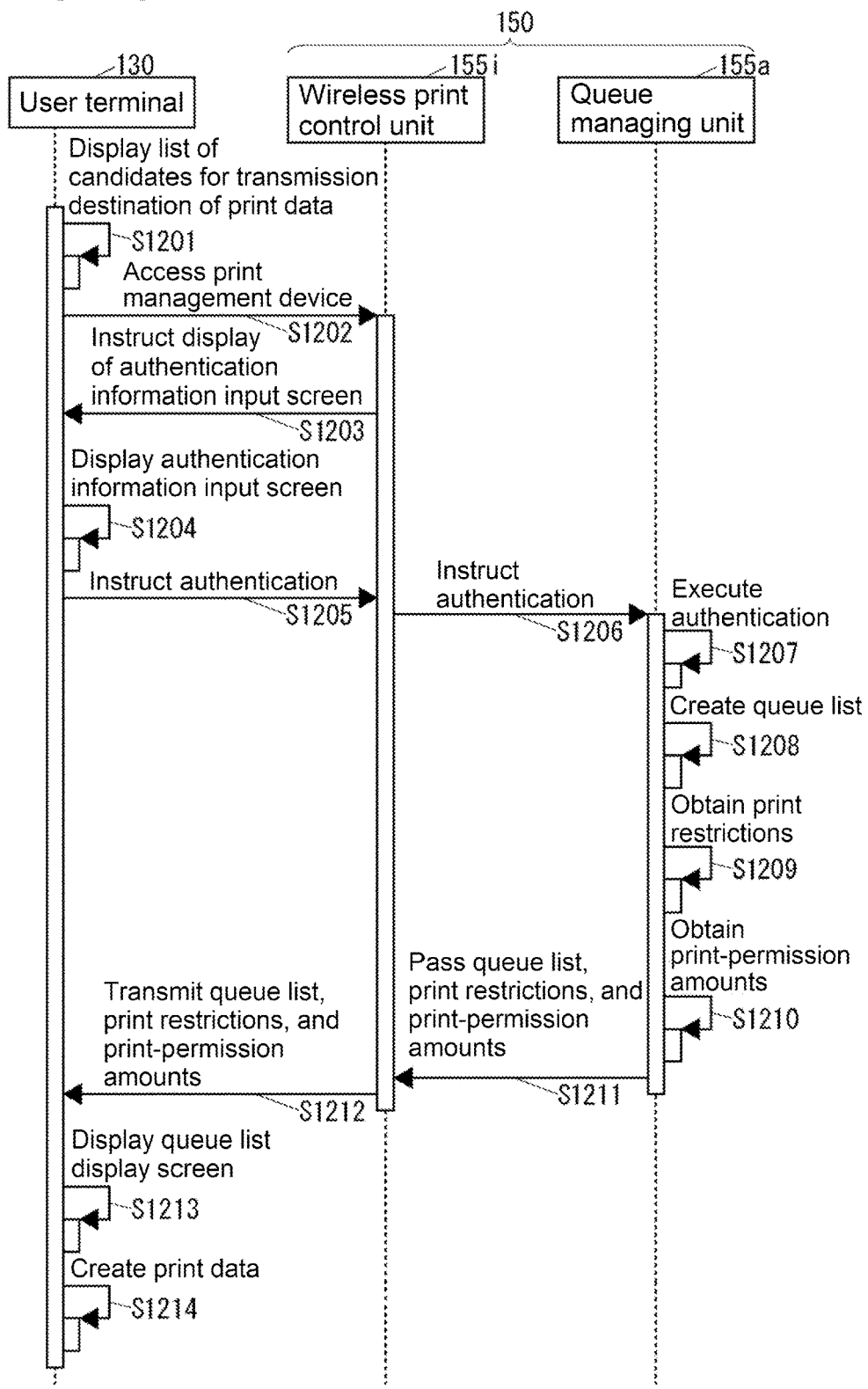
FIG. 10 shows a sequence diagram of operations of the printing system when the user terminal according to the first embodiment displays the queue list.

FIG. 10 shows a sequence diagram of the operations of the printing system 110 when the queue list is displayed on the user terminal 130 according to the first embodiment.

When the performance of the printing is instructed via the operation unit 131 in the user terminal 130, as illustrated in FIG. 10, the wireless print control unit 135a in the user terminal 130 displays a list of candidates for a transmission destination of the print data (Step S1201). Here, this list includes the print management device 150. Accordingly, the user can specify the print management device 150 via the operation unit 131.

When the print management device 150 is designated in the list displayed at Step S1201, the wireless print control unit 135a accesses the print management device 150 over the communications in the wireless printing protocol (Step S1202).

When the queue notifying unit 155k in the wireless print control unit 155i of the print management device 150 is accessed at Step S1202, the queue notifying unit 155k instructs the user terminal 130 to display the authentication information input screen over communications in the wireless printing protocol (Step S1203).

Accordingly, the wireless print control unit 135a in the user terminal 130 displays the authentication information input screen on the display 132 (Step S1204). Accordingly, the user can input the authentication information to the authentication information input screen via the operation unit 131.

When the authentication information is input to the authentication information input screen, the wireless print control unit 135a transmits the input authentication information to the print management device 150 over communications in the wireless printing protocol to instruct the print management device 150 to perform the authentication of the user (Step S1205).

When the authentication of the user is instructed at Step S1205, the queue notifying unit 155k in the wireless print control unit 155i of the print management device 150 passes the authentication information transmitted from the user terminal 130 at Step S1205 to the queue managing unit 155a via the transmission/reception control unit 155h to instruct the queue managing unit 155a to perform the authentication of the user (Step S1206).

When the authentication of the user is instructed from the queue notifying unit 155k, the queue manager 155b in the queue managing unit 155a performs the authentication of the user based on the authentication information passed from the queue notifying unit 155k and the user management information 154b (Step S1207).

When the authentication at Step S1207 succeeds and the user is identified, the queue manager 155b creates the queue list, which shows combinations of the queue IDs, the kinds of the queues, and the device IDs related to the queues of all queues related to the user IDs based on the user IDs of the users identified by the authentication at Step S1207 and the queue management information 154c (Step S1208).

Next, the print restriction managing unit 155c in the queue managing unit 155a obtains the print restrictions of these users based on the users identified by the authentication at Step S1207 and the print restriction management information 154d (Step S1209).

Next, the print-permission amount managing unit 155d in the queue managing unit 155a obtains the print-permission amounts for the users based on the users identified by the authentication at Step S1207 and the print-permission amount management information 154e (Step S1210).

Next, the queue manager 155b in the queue managing unit 155a passes the queue list created at Step S1208, the print restrictions obtained at Step S1209, and the print-permission amounts obtained at Step S1210 to the wireless print control unit 155i via the transmission/reception control unit 155h (Step S1211).

When the queue list, the print restrictions, and the print-permission amounts are passed from the queue managing unit 155a, the queue notifying unit 155k in the wireless print control unit 155i transmits the passed queue list, print restrictions, and print-permission amounts to the user terminal 130 over communications in the wireless printing protocol (Step S1212).

When the queue list is transmitted from the print management device 150, the wireless print control unit 135a in the user terminal 130 displays the queue list display screen 160 (see FIG. 8), which shows the transmitted queue list, on the display 122 (Step S1213).

The wireless print control unit 135a in the user terminal 130 creates print data that suits the print restrictions transmitted at Step S1212 and does not exceed the print-permission amount transmitted at Step S1212 (Step S1214).

Next, the following describes the operations of the printing system 110 when the queue is designated in the queue list 161 displayed on the user terminal 130.

Figure 11:
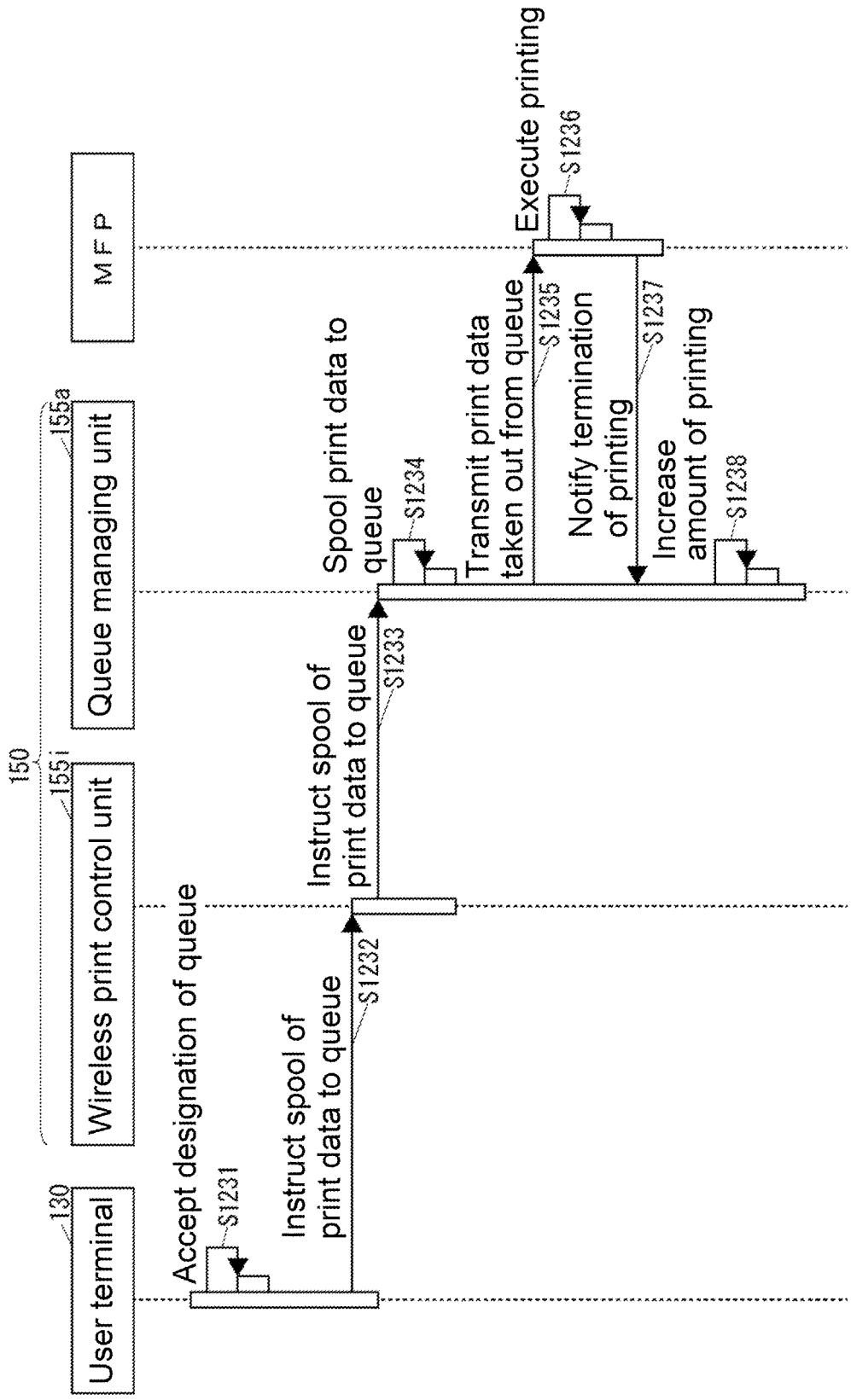
FIG. 11 shows a sequence diagram of operations of the printing system when the queue is designated in the queue list displayed on the user terminal according to the first embodiment.

FIG. 11 shows a sequence diagram of the operations of the printing system 110 when the queue is designated in the queue list 161 displayed on the user terminal 130 according to the first embodiment.

Pressing the designation button 162 while any one of the queues is selected in the queue list 161 on the queue list display screen 160, the wireless print control unit 135a in the user terminal 130 accepts the designation of the queue selected in the queue list 161 as illustrated in FIG. 11 (Step S1231).

Next, the wireless print control unit 135a transmits the print data created at Step S1214 and the queue ID of the queue accepted at Step S1231 to the print management device 150 over communications in the wireless printing protocol to instruct the print management device 150 to spool the print data to the queue (Step S1232).

When the spool of the print data to the queue is instructed at Step S1232, the designation accepting unit 155l in the wireless print control unit 155i of the print management device 150 receives the print data and the queue ID transmitted at Step S1232 and passes the received print data and queue ID to the queue managing unit 155a via the transmission/reception control unit 155h to instruct the queue managing unit 155a to spool the print data to the queue (Step S1233). When a format of the print data received from the user terminal 130 is not a format suitable for the queue managing unit 155a, the wireless communication unit 155j converts the format of the print data received from the user terminal 130 into the format suitable for the queue managing unit 155a. For example, the wireless communication unit 155j converts URF, PWG, or PCLm print data into PCL5 print data.

When the spool of the print data to the queue is instructed at Step S1233, the data storage unit 155e in the queue managing unit 155a stores the print data passed at Step S1233 to the queue corresponding to the queue ID passed at Step S1233 among the queues managed by the queue manager 155b (Step S1234).

When the print data stored in the queue at Step S1234 has a turn to be taken out, the data transmitting unit 155f in the queue managing unit 155a takes out the print data from this queue and transmits the print data to the MFP related to this queue in the queue management information 154c, similar to the process at Step S1134 (Step S1235).

When the print data is transmitted at Step S1235, the control unit in the MFP performs the printing by a printer based on the transmitted print data (Step S1236). When the printing performed at Step S1236 terminates, the control unit notifies the print management device 150 of the termination of the printing (Step S1237).

When the termination of the printing is notified at Step S1237, the print amount managing unit 155g in the queue managing unit 155a of the print management device 150 increases the amount of printing of the user identified by the authentication at Step S1207 in the print-permission amount management information 154e according the amount of printing performed at Step S1236 (Step S1238). Here, after increasing the amount of printing, the print amount managing unit 155g also changes the print-permission amount by subtracting the amount of printing from the amount of print upper limit.

As described above, since the print management device 150 communicates with the user terminal in the wireless printing protocol, even when a driver corresponding to a specific MFP is not installed on the user terminal, the print data can be received (Step S1232) over wireless communications from the user terminal. Accordingly, the print management device 150 can improve a convenience of the printing using the queues.

Even when the driver corresponding to the specific MFP is not installed on the user terminal, since the print management device 150 accepts the designation of the queue from the user terminal (Step S1232), the convenience of the printing using the queues can be improved.

Even when the driver corresponding to the specific MFP is not installed on the user terminal, since the print management device 150 transmits the print data suited for the print restrictions of the user who logs in to the print management device 150 from the user terminal to the MFP, the convenience of the printing using the queues can be improved.

Even when the driver corresponding to the specific MFP is not installed on the user terminal, since the print management device 150 transmits the print data according to the print-permission amount of the user who logs in to the print management device 150 from the user terminal to the MFP, the convenience of the printing using the queues can be improved.

B. Second Embodiment

The following describes the second embodiment of the disclosure with reference to the accompanying drawings.

First, a description will be given of a configuration of a printing system according to the second embodiment.

Figure 12:
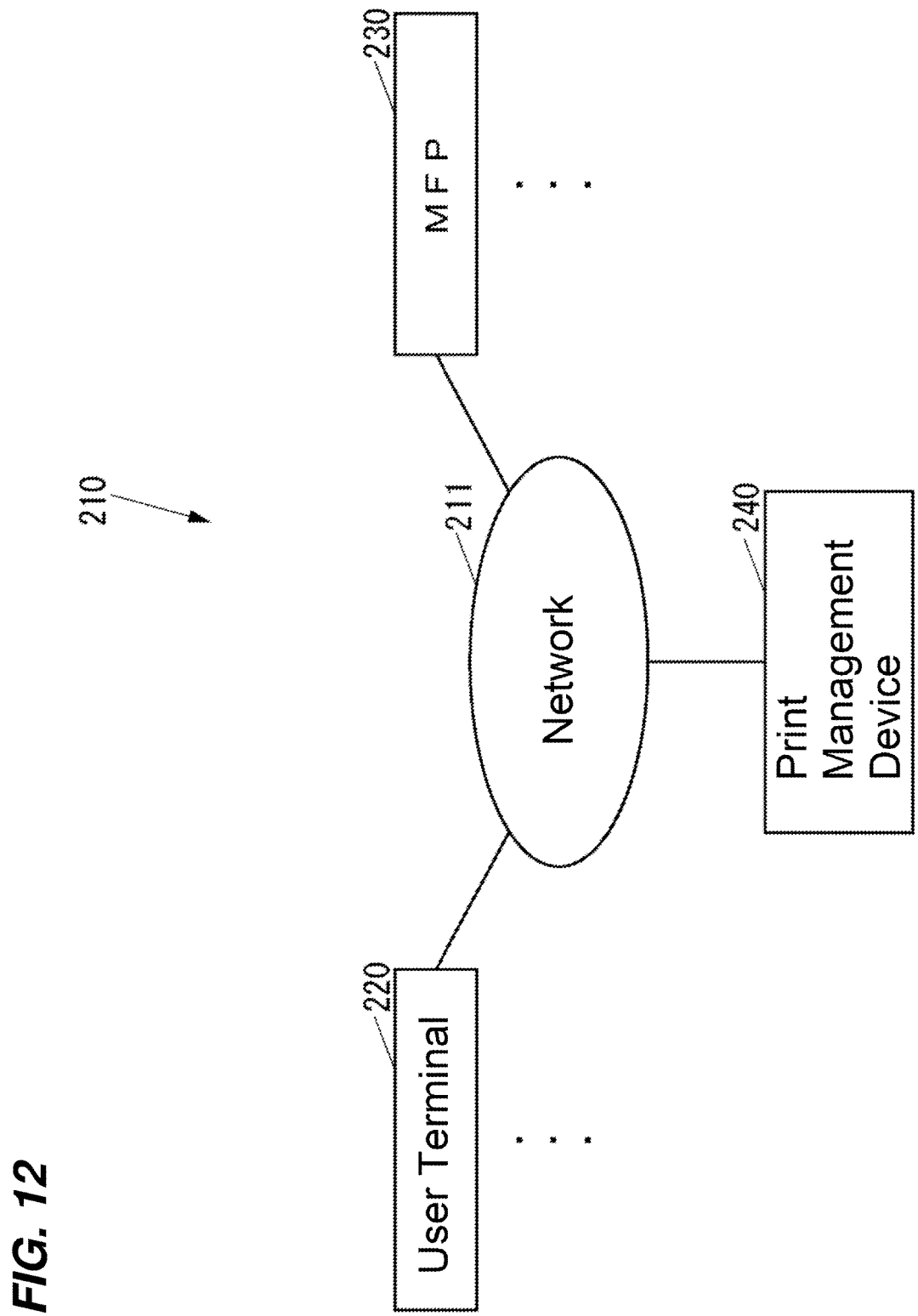
FIG. 12 shows a block diagram of a printing system according to a second embodiment of the disclosure.

FIG. 12 shows a block diagram of a printing system 210 according to the second embodiment.

As illustrated in FIG. 12, the printing system 210 includes: a user terminal 220 that transmits print data described in page description language such as a printer control language (PCL); a multifunction peripheral (MFP) 230 as an image forming apparatus that performs a printing based on the print data, and a print management device 240 that manages queues related to the MFPs.

The user terminal 220 and the MFP 230 are communicable with one another via a network 211 such as the Internet or a local area network (LAN). The user terminal 220 and the print management device 240 are communicable with one another via the network 211. The MFP 230 and the print management device 240 are communicable with one another via the network 211.

The printing system 210 can include at least one user terminal that has a similar configuration with the user terminal 220 besides the user terminal 220. Similarly, the printing system 210 can include at least one MFP that has a similar configuration with the MFP 230 besides the MFP 230.

Figure 13:
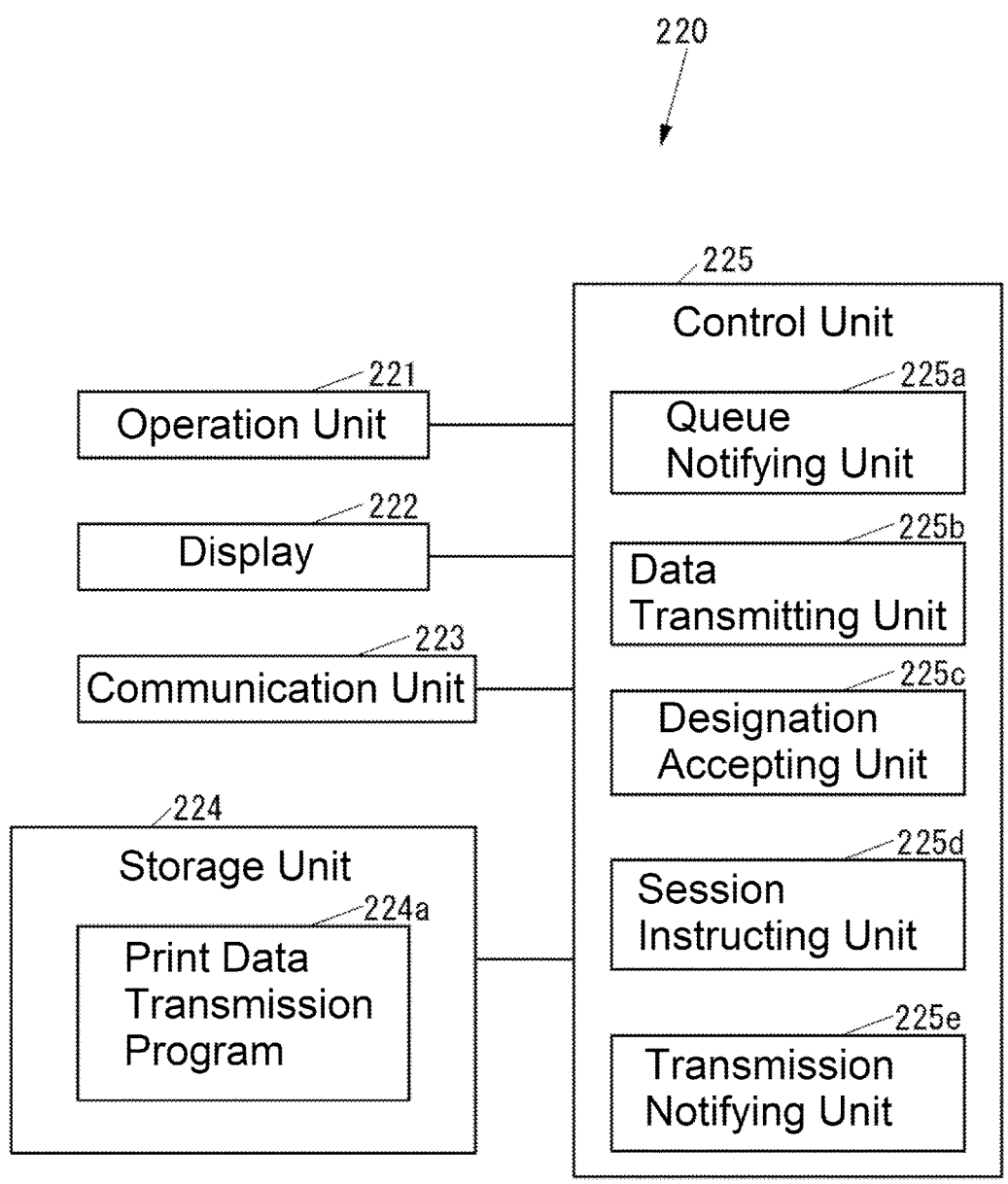
FIG. 13 shows a block diagram of a user terminal according to the second embodiment.

FIG. 13 shows a block diagram of the user terminal 220 according to the second embodiment.

As illustrated in FIG. 13, the user terminal 220 includes: an operation unit 221 as an input device such as a button, a keyboard, or a computer mouse with which various kinds of operations are input; a display 222 as a display device such as a liquid crystal display (LCD) that displays various kinds of information; a communication unit 223 as a communication device that communicates with an external device via the network 211 (see FIG. 12), or directly via wired or wireless connection without via the network 211; a storage unit 224 as a non-volatile storage device such as a semiconductor memory or a hard disk drive (HDD) that stores various kinds of information; and a control unit 225 that controls the whole user terminal 220. The user terminal 220 is, for example, a computer such as a smart phone, a tablet, or a personal computer (PC).

The storage unit 224 stores a print data transmission program 224a to transmit the print data. The print data transmission program 224a may be installed into the user terminal 220 at a production stage of the user terminal 220, may be additionally installed into the user terminal 220 from an external storage medium such as a compact disk (CD), a digital versatile disk (DVD), a universal serial bus (USB) memory, or may be additionally installed into the user terminal 220 from the network 211.

The control unit 225 includes, for example, the following: a central processing unit (CPU); a read-only memory (ROM) that stores programs and various kinds of data; and a random-access memory (RAM) used as a work area of the CPU. The CPU executes the programs stored in the ROM or the storage unit 224.

The control unit 225 executes the print data transmission program 224a to achieve a queue notifying unit 225a that notifies queues managed by the print management device 240 (see FIG. 12), a data transmitting unit 225b that transmits the print data, a designation accepting unit 225c that accepts a designation of any of the queues notified by the queue notifying unit 225a, a session instructing unit 225d that instructs the print management device 240 to start a session with an MFP candidate for the transmission destination of the print data by the data transmitting unit 225b, and a transmission notifying unit 225e that notifies the print management device 240 of the transmission of the print data to the MFP by the data transmitting unit 225b.

Kinds of the queues managed by the print management device 240 include a usual queue to which one MFP is related and can spool the print data, a tandem queue to which a plurality of MFPs for which the print data can be assigned are related and can spool the print data, and a special tandem queue to which the plurality of MFPs for which the print data can be assigned are related but that does not spool print data. Here, the special tandem queue does not spool the print data but manages the printing, constituting print management information of the disclosure. Accordingly, the queue notifying unit 225*a* constitutes a print management information notifying unit of the disclosure.

Figure 14:
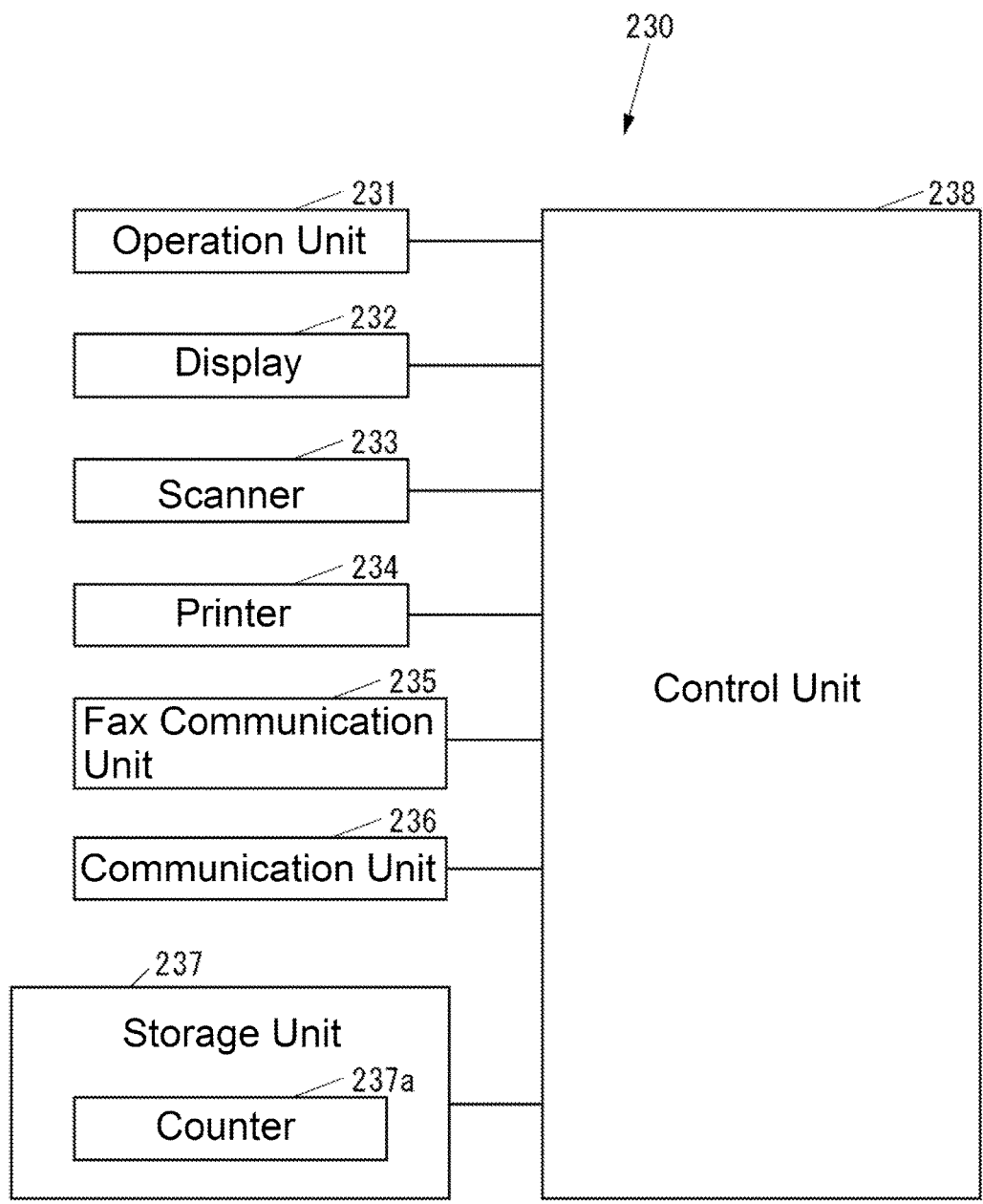
FIG. 14 shows a block diagram of an MFP according to the second embodiment.

FIG. 14 shows a block diagram of the MFP 230 according to the second embodiment.

As illustrated in FIG. 14, the MFP 230 includes: an operation unit 231 as an input device such as a button with which various kinds of operations are input; a display 232 as a display device such as an LCD that displays various kinds of information; a scanner 233 as a reading device that reads an image from a document; a printer 234 as a print device that prints an image to a recording medium such as a paper sheet; a fax communication unit 235 as a fax device that performs fax communications with an external facsimile device (not illustrated) via a communication line such as a dial-up line; a communication unit 236 as a communication device that communicates with an external device via the network 211 (see FIG. 12) or directly via wired or wireless connection without via the network 211; a storage unit 237 as a non-volatile storage device such as a semiconductor memory or an HDD that stores various kinds of information; and a control unit 238 that controls the whole MFP 230.

The storage unit 237 stores a counter 37*a* that indicates the amount printed by the printer 234.

The control unit 238 includes, for example, a CPU, a ROM that stores programs and various kinds of data, and a RAM used as a work area for the CPU. The CPU executes the programs stored in the ROM or the storage unit 237.

Figure 15:
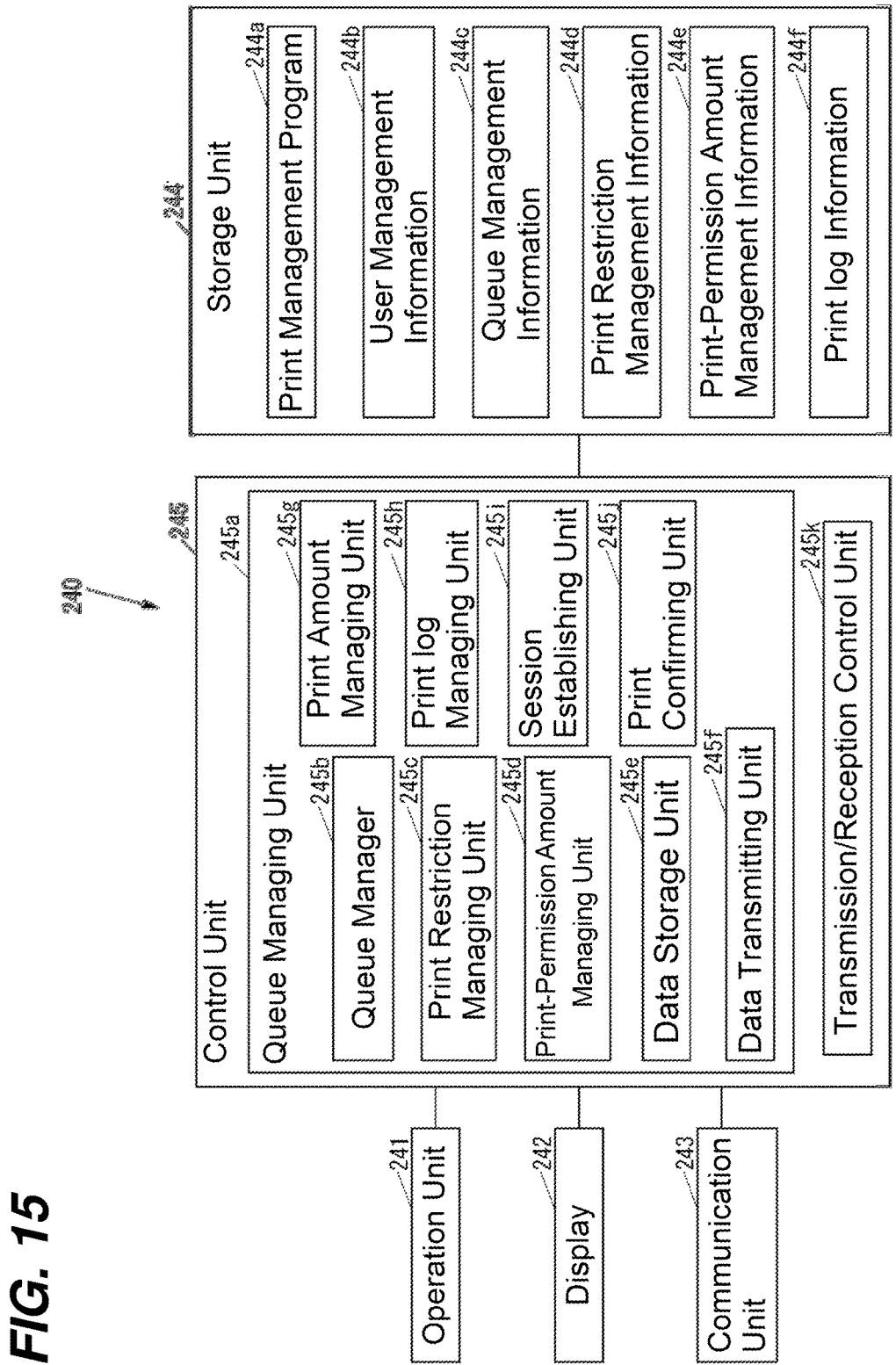
FIG. 15 shows a block diagram of a print management device according to the second embodiment.

FIG. 15 shows a block diagram of the print management device 240 according to the second embodiment.

As illustrated in FIG. 15, the print management device 240 includes: an operation unit 241 as an input device such as a keyboard or a computer mouse with which various kinds of operations are input; a display 242 as a display device such as an LCD that displays various kinds of information; a communication unit 243 as a communication device that communicates with an external device via the network 211 (see FIG. 12), or directly via wired or wireless connection without via the network 211; a storage unit 244 as a non-volatile storage device such as a semiconductor memory or a HDD that stores various kinds of information; and a control unit 245 that controls the whole print management device 240. The print management device 240 is, for example, a computer such as a PC.

The storage unit 244 stores a print management program 244*a* to manage the queues. The print management program 244*a* may be installed into the print management device 240 at a production stage of the print management device 240, may be additionally installed into the print management device 240 from an external storage medium such as a USB memory, a CD, or a DVD, or may be additionally installed into the print management device 240 from the network 211.

The storage unit 244 stores user management information 244*b* that shows authentication information to authenticate the user by users. Here, the authentication information, for example, may be the combination of the user ID as the identification information of the user and the password or may be the personal identification number (PIN). Various kinds of information included in the user management information 244*b* can be added, changed, or deleted by the administrator.

The storage unit 244 stores queue management information 244*c* to manage the queues.

Figure 16:
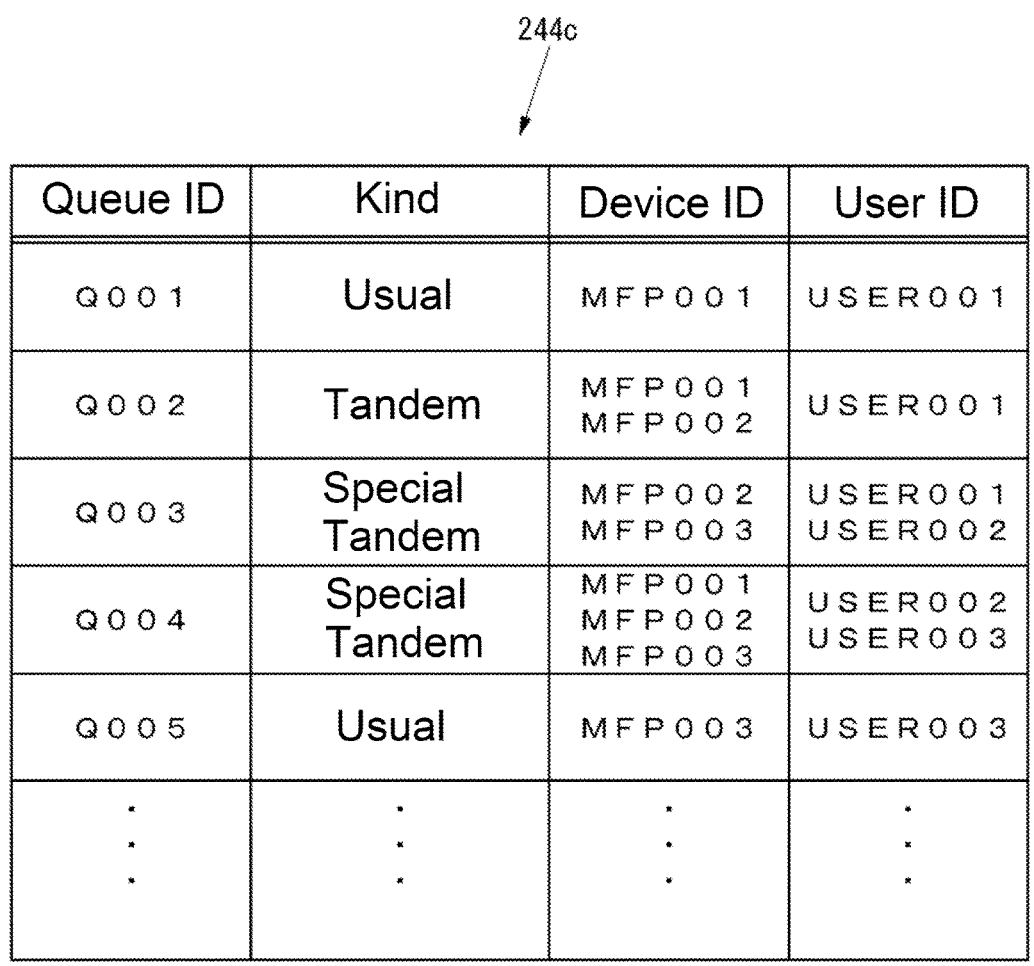
FIG. 16 shows exemplary queue management information according to the second embodiment.

FIG. 16 shows the exemplary queue management information 244*c* according to the second embodiment.

As illustrated in FIG. 16, the queue management information 244*c* is information showing queue IDs as identification information of the queues, the kinds of the queues, device IDs as identification information of the MFPs related to the queues, and user IDs of the users related to the queues by queues. The various kinds of information included in the queue management information 244*c* can be added, changed, or deleted by the administrator.

As illustrated in FIG. 15, the storage unit 244 stores print restriction management information 244*d* to manage print restrictions as restrictions on print functions to the user. The print restriction management information 244*d* is information showing the print restrictions by users. The print restrictions include, for example, inhibition of color printing, inhibition of single-side printing, and inhibition of printing without aggregations. The various kinds of information included in the print restriction management information 244*d* can be added, changed, or deleted by the administrator.

The storage unit 244 stores print-permission amount management information 244*e* to manage a print-permission amount as an amount of printing permitted to the user. The print-permission amount management information 244*e* is information showing an amount of print upper limit, which indicates the amount of the upper limit of the printing permitted to the user, an amount of printing performed by the user, and the print-permission amount, which is found by subtracting the amount of printing from the amount of print upper limit, by users. The amount of printing is, for example, used as a criterion to settle an amount of money charged to the user. The various kinds of information included in the print-permission amount management information 244*e* can be added, changed, or deleted by the administrator.

The storage unit 244 can store print log information 244*f* showing logs of printing by the MFP. Here, the logs of the printing include, for example, time at which the printing is performed, the user ID of the user who has performed the printing, a count of printed pages, information on whether the printing has been monochrome printing or color printing, information on whether duplex printing has been performed or not, and information on whether aggregate print has been performed or not. The administrator can confirm the logs shown in the print log information 244*f* at any timing.

The control unit 245 includes, for example, a CPU, a ROM that stores programs and various kinds of data, and a RAM used as a work area for the CPU. The CPU executes the programs stored in the ROM or the storage unit 244.

The control unit 245 executes the print management program 244*a* to achieve a queue managing unit 245*a* that manages the queues and a transmission/reception control unit 245*k* that controls transmission/reception of the information to the external device.

The queue managing unit 245*a* achieves a queue manager 245*b* that manage the queues, a print restriction managing unit 245*c* that manages the print restrictions, a print-permission amount managing unit 245*d* that manages the print-permission amount, a data storage unit 245*e* that stores the print data received from the user terminal in the queue managed by the queue manager 245*b*, a data transmitting unit 245*f* that takes out the print data from the queue and transmits the print data to the MFP related to the queue, a print amount managing unit 245g that manages the amount of printing to the printing by the MFP, a print log managing unit 245h that manages the logs of the printing by the MFP, a session establishing unit 245i that establishes the session instructed from the user terminal, and a print confirming unit 245j that performs the confirmation of completion of the printing based on this print data to the MFP when the transmission of the print data to this MFP is notified from the user terminal.

While the following omits the explanation on the operations of the transmission/reception control unit 245k, the transmission/reception control unit 245k is always interposed for the transmission/reception of information between the user terminal 220 and the queue managing unit 245a.

Next, a description will be given of operations of the printing system 210.

First, the following describes the operations of the printing system 210 when a list of the queues (hereinafter referred to as "queue list") is displayed.

Figure 17:
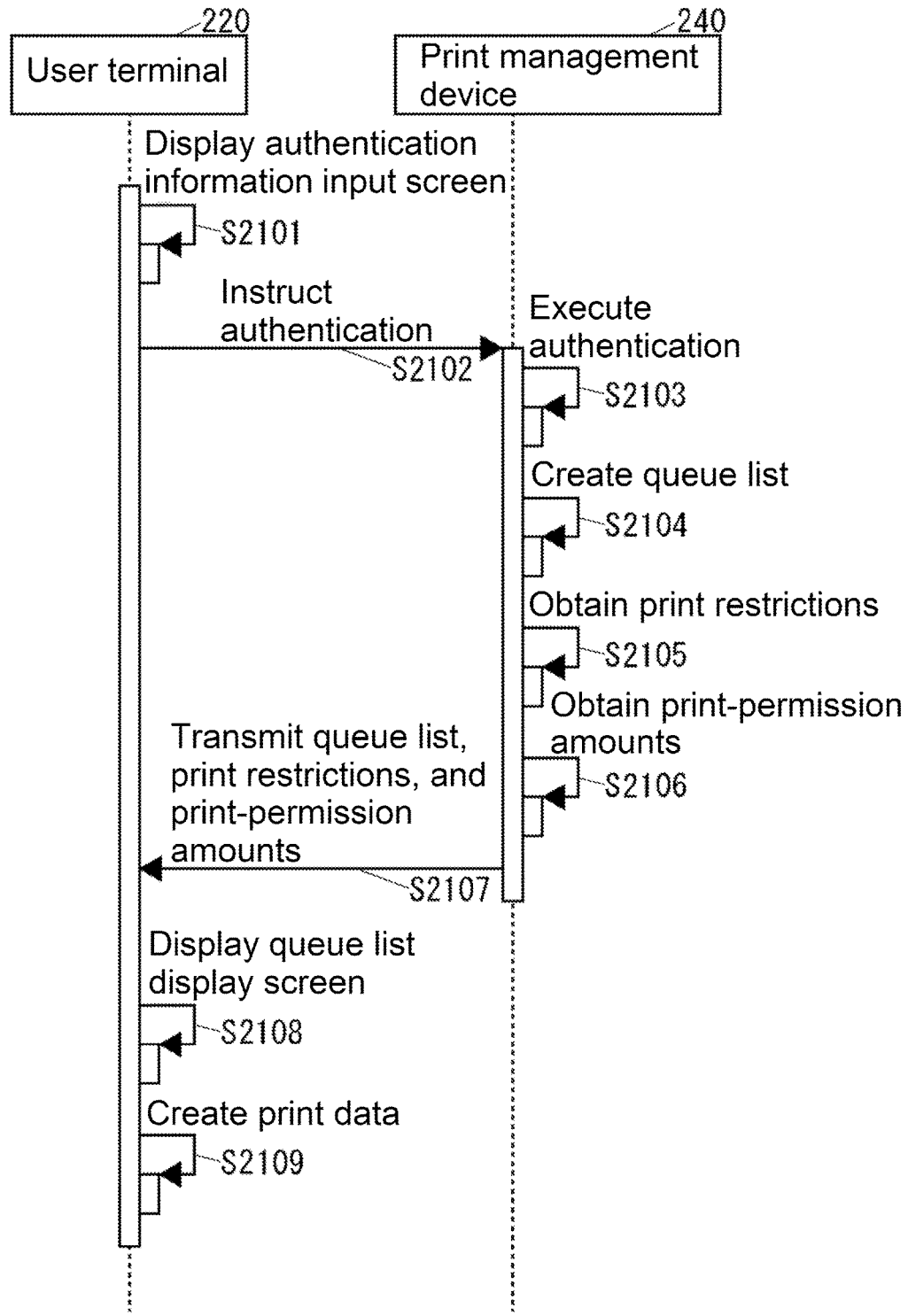
FIG. 17 shows a printing system according to the second embodiment when the queue list is displayed.

FIG. 17 shows a sequence diagram of the operations of the printing system 210 according to the second embodiment when the queue list is displayed.

When the performance of the printing is instructed via the operation unit 221 in the user terminal 220, as illustrated in FIG. 17, the queue notifying unit 225a in the user terminal 220 displays an authentication information input screen to which the authentication information of the user is input on the display 222 (Step S2101). Accordingly, the user can input the authentication information in the authentication information input screen via the operation unit 221.

When the authentication information is input to the authentication information input screen, the queue notifying unit 225a transmits the input authentication information to the print management device 240 to instruct the print management device 240 to perform the authentication of the user (Step S2102).

When the user terminal 220 instructs the authentication of the user, the queue manager 245b in the print management device 240 performs the authentication of the user based on the authentication information transmitted from the user terminal 220 and the user management information 244b (Step S2103).

When the authentication at Step S2103 succeeds and the user is identified, the queue manager 245b creates the queue list, which shows combinations of the queue IDs, the kinds of the queues, and the device IDs related to the queues of all queues related to the user IDs based on the user IDs of the users identified by the authentication at Step S2103 and the queue management information 244c (Step S2104).

Next, the print restriction managing unit 245c in the print management device 240 obtains the print restrictions of these users based on the users identified by the authentication at Step S2103 and the print restriction management information 244d (Step S2105).

Next, the print-permission amount managing unit 245d in the print management device 240 obtains the print-permission amounts for the users based on the users identified by the authentication at Step S2103 and the print-permission amount management information 244e (Step S2106).

Next, the queue manager 245b in the print management device 240 transmits the queue list created at Step S2104, the print restrictions obtained at Step S2105, and the print-permission amounts obtained at Step S2106 to the user terminal 220 (Step S2107).

When the queue list is transmitted from the print management device 240, the queue notifying unit 225a in the user terminal 220 displays a queue list display screen 250 (see FIG. 18), which shows the transmitted queue list, on the display 222 (Step S2108).

Figure 18:
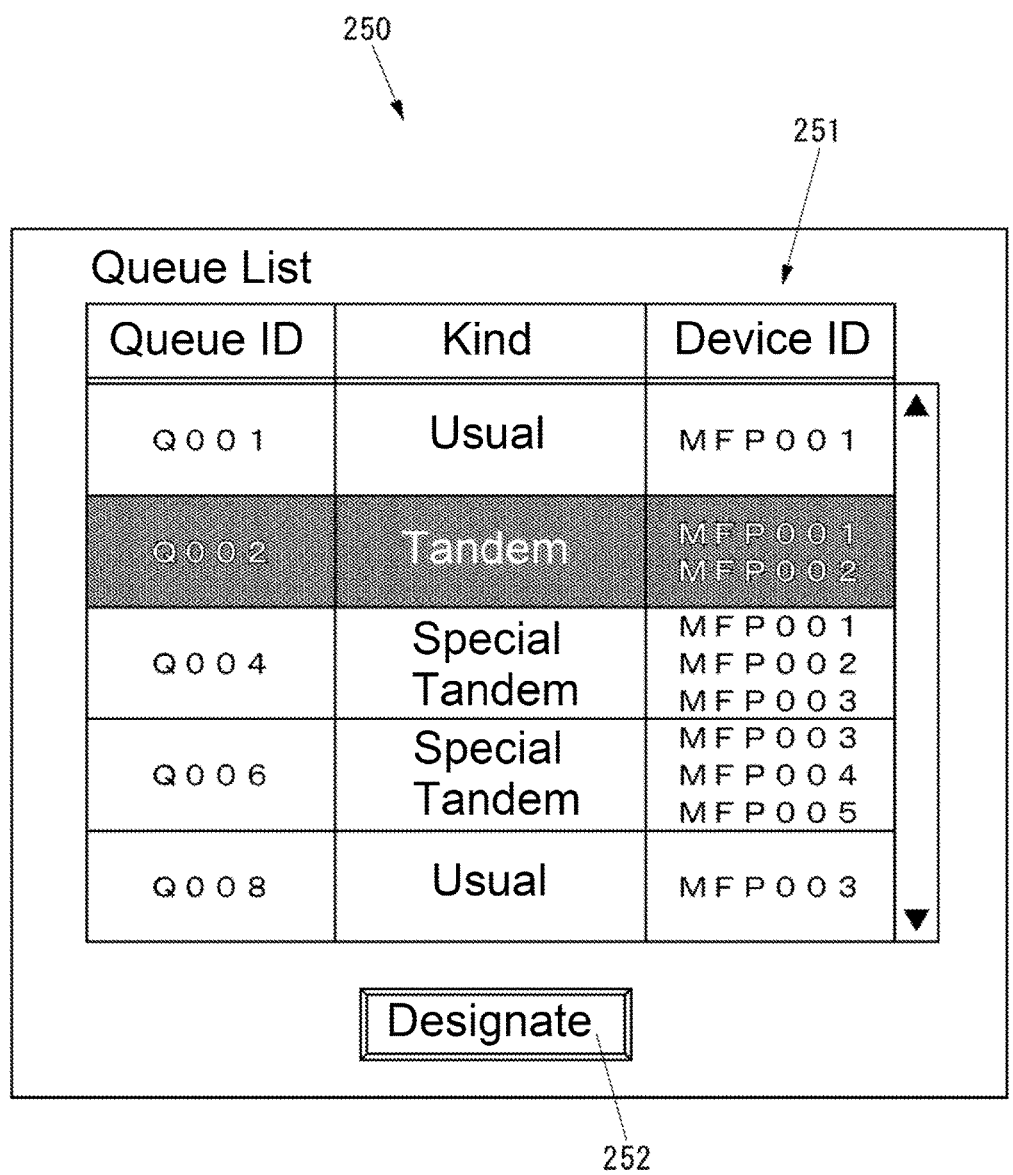
FIG. 18 shows an exemplary queue list display screen displayed in the operation illustrated in FIG. 17.

FIG. 18 shows the exemplary queue list display screen 250.

As illustrated in FIG. 18, the queue list display screen 250 includes a queue list 251 and a designation button 252 to accept the designation of the queue selected in the queue list 251. Any one of queues is selectable from the queue list 251 and a row of the selected queue is displayed in black-and-white inversion. In the queue list 251, the queues can be sorted by the queue IDs or the kinds.

As illustrated in FIG. 17, the data transmitting unit 225b in the user terminal 220 creates print data that suits the print restrictions transmitted at Step S2107 and according to the print-permission amount transmitted at Step S2107 (Step S2109).

Next, the following describes the operations of the printing system 210 when the usual queue is designated in the queue list 251.

Figure 19:
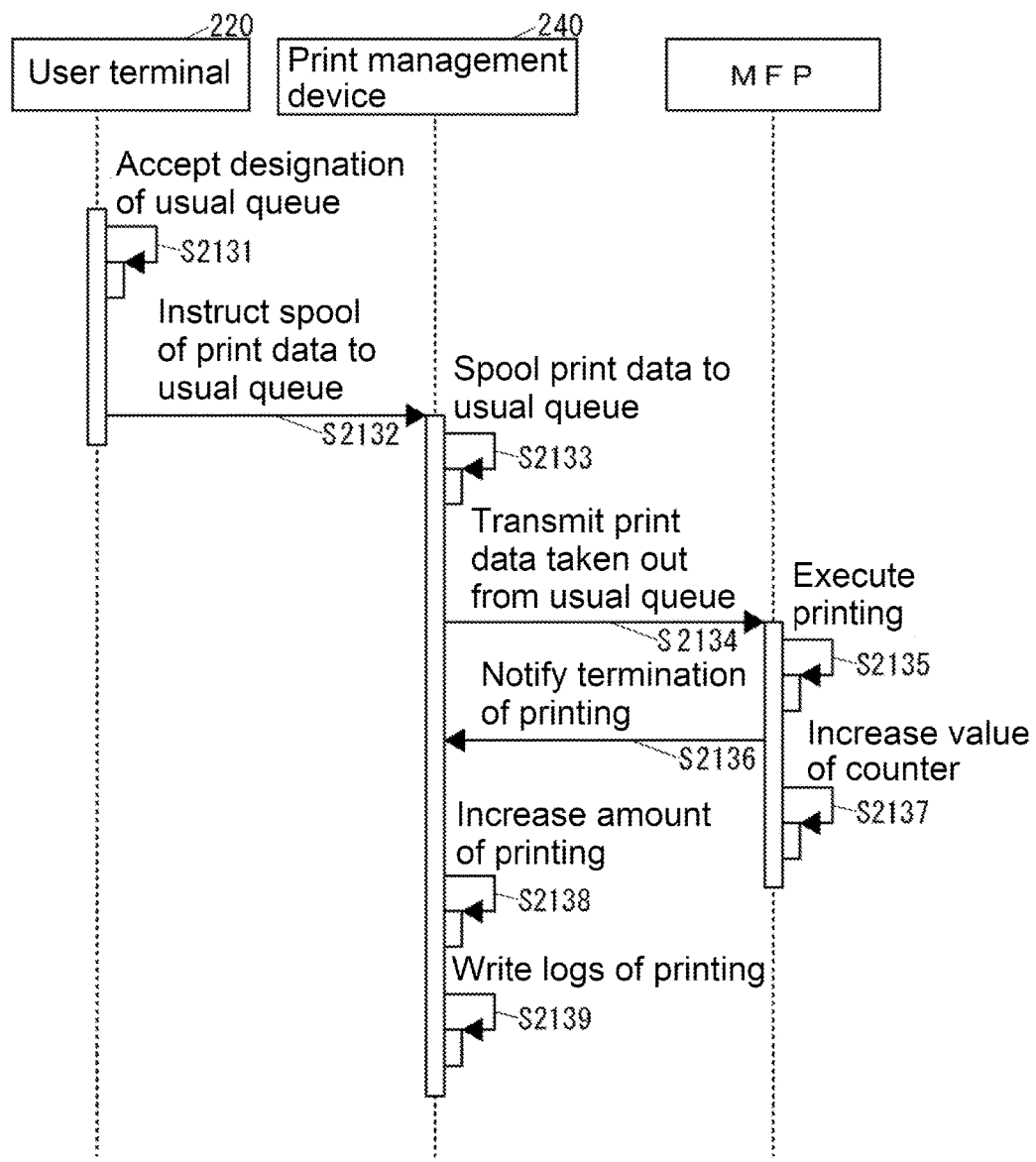
FIG. 19 shows a sequence diagram of operations of the printing system according to the second embodiment when a usual queue is designated in the queue list.

FIG. 19 shows a sequence diagram of the operations of the printing system 210 according to the second embodiment when the usual queue is designated in the queue list 251.

As illustrated in FIG. 19, pressing the designation button 252 while any one of the usual queues is selected in the queue list 251 on the queue list display screen 250, the designation accepting unit 225c in the user terminal 220 accepts the designation of the usual queue selected in the queue list 251 (Step S2131).

Next, the data transmitting unit 225b transmits the print data created at Step S2109 and the queue ID of the usual queue accepted at Step S2131 to the print management device 240 to instruct the print management device 240 to spool the print data to the usual queue (Step S2132).

When the spool of the print data to the usual queue is instructed at Step S2132, the data storage unit 245e in the print management device 240 stores the print data transmitted at Step S2132 to the usual queue corresponding to the queue ID transmitted at Step S2132 among the queues managed by the queue manager 245b (Step S2133).

When the print data stored in the usual queue at Step S2133 has a turn to be taken out, the data transmitting unit 245f in the print management device 240 takes out the print data from this usual queue and transmits the print data to the MFP related to this usual queue in the queue management information 244c (Step S2134).

When the print data is transmitted at Step S2134, the control unit in the MFP performs the printing by a printer based on the transmitted print data (Step S2135).

When the printing performed at Step S2135 terminates, the control unit in the MFP notifies the print management device 240 of the termination of the printing (Step S2136) and increases the value of the counter 37a according to the amount of printing performed at Step S2135 (Step S2137).

When the termination of the printing is notified at Step S2136, the print amount managing unit 245g in the print management device 240 increases the amount of printing of the user identified by the authentication at Step S2103 in the print-permission amount management information 244e according to the amount of printing performed at Step S2135 (Step S2138). Here, after increasing the amount of printing, the print amount managing unit 245g also changes the print-permission amount by subtracting the amount of printing from the amount of print upper limit.

After the process at Step S2138, the print log managing unit 245h in the print management device 240 writes the logs of printing performed at Step S2135 to the print log information 244f (Step S2139).

Next, the following describes the operations of the printing system 210 when the tandem queue is designated in the queue list 251.

Figure 20:
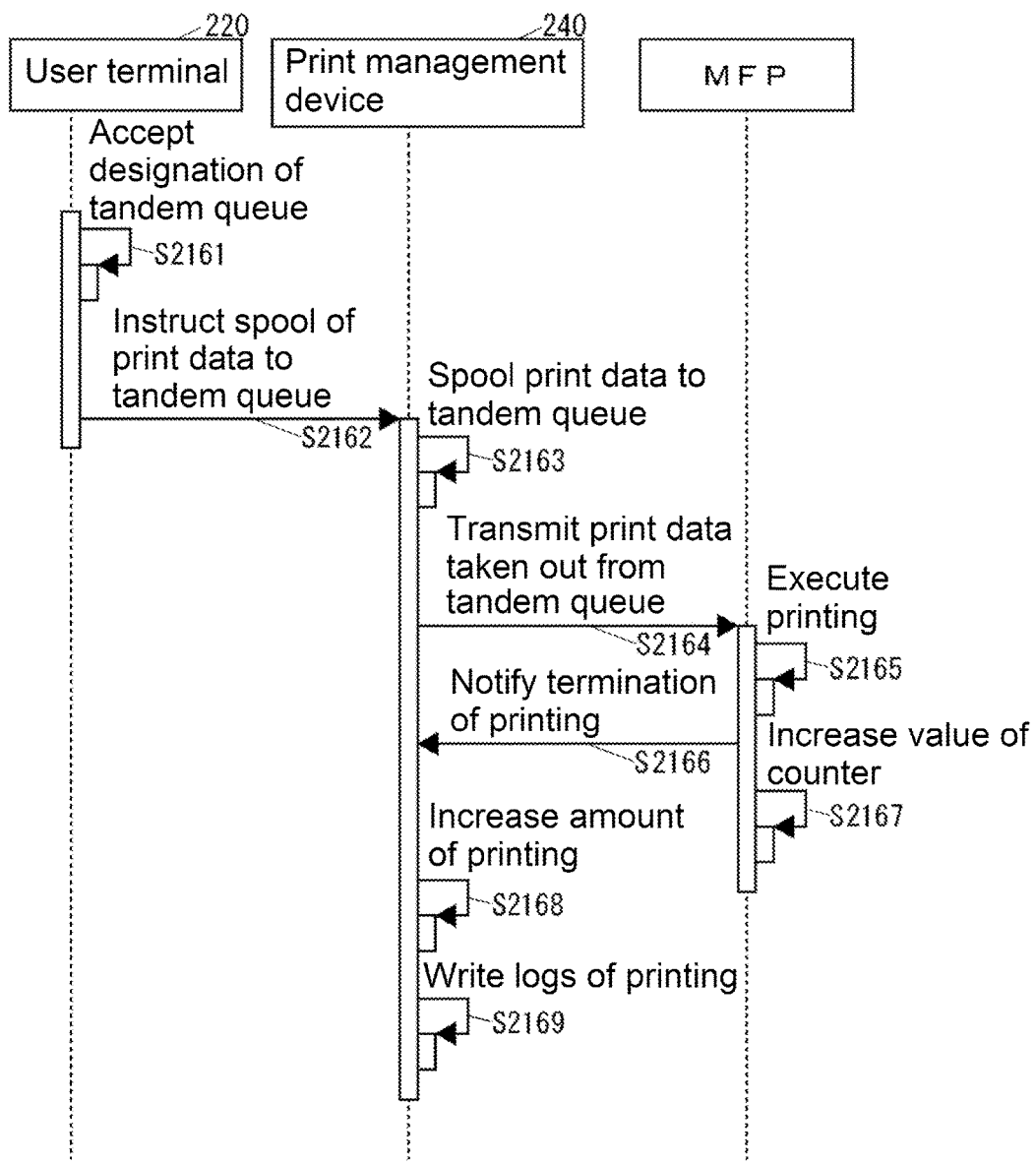
FIG. 20 shows a sequence diagram of operations of the printing system according to the second embodiment when a tandem queue is designated in the queue list.

FIG. 20 illustrates the operations of the printing system 210 according to the second embodiment when the tandem queue is designated in the queue list 251.

Pressing the designation button 252 while any one of the tandem queues is selected in the queue list 251 on the queue list display screen 250, the designation accepting unit 225c in the user terminal 220 accepts the designation of the tandem queue selected in the queue list 251 as illustrated in FIG. 20 (Step S2161).

Next, the data transmitting unit 225b transmits the print data created at Step S2109 and the queue ID of the tandem queue accepted at Step S2161 to the print management device 240 to instruct the print management device 240 to spool the print data to the tandem queue (Step S2162).

When the spool of the print data to the tandem queue is instructed at Step S2162, the data storage unit 245e in the print management device 240 stores the print data transmitted at Step S2162 to the tandem queue corresponding to the queue ID transmitted at Step S2162 among the queues managed by the queue manager 245b (Step S2163).

When the print data stored in the tandem queue at Step S2163 has a turn to be taken out, the data transmitting unit 245f in the print management device 240 takes out the print data from this tandem queue and transmits the print data to the most appropriate MFP among the MFPs related to this tandem queue in the queue management information 244c (Step S2164). Here, the most appropriate MFP is, for example, an MFP with a high possibility of the earliest termination of the performance of printing based on this print data among the MFPs related to this tandem queue in the queue management information 244c. The MFP with the high possibility of the earliest termination of the performance of printing is, for example, an MFP with the least count of print data standing by for performance of printing among the MFPs related to this tandem queue in the queue management information 244c. The data transmitting unit 245f may make an inquiry for information required to settle the most appropriate MFP to the MFP to acquire the information.

Since the processes at Steps S2165 to S2169 are similar to the processes at Steps S2135 to S2139, the following omits the explanation.

Next, the following describes the operations of the printing system 210 when the special tandem queue is designated in the queue list 251.

Figure 21:
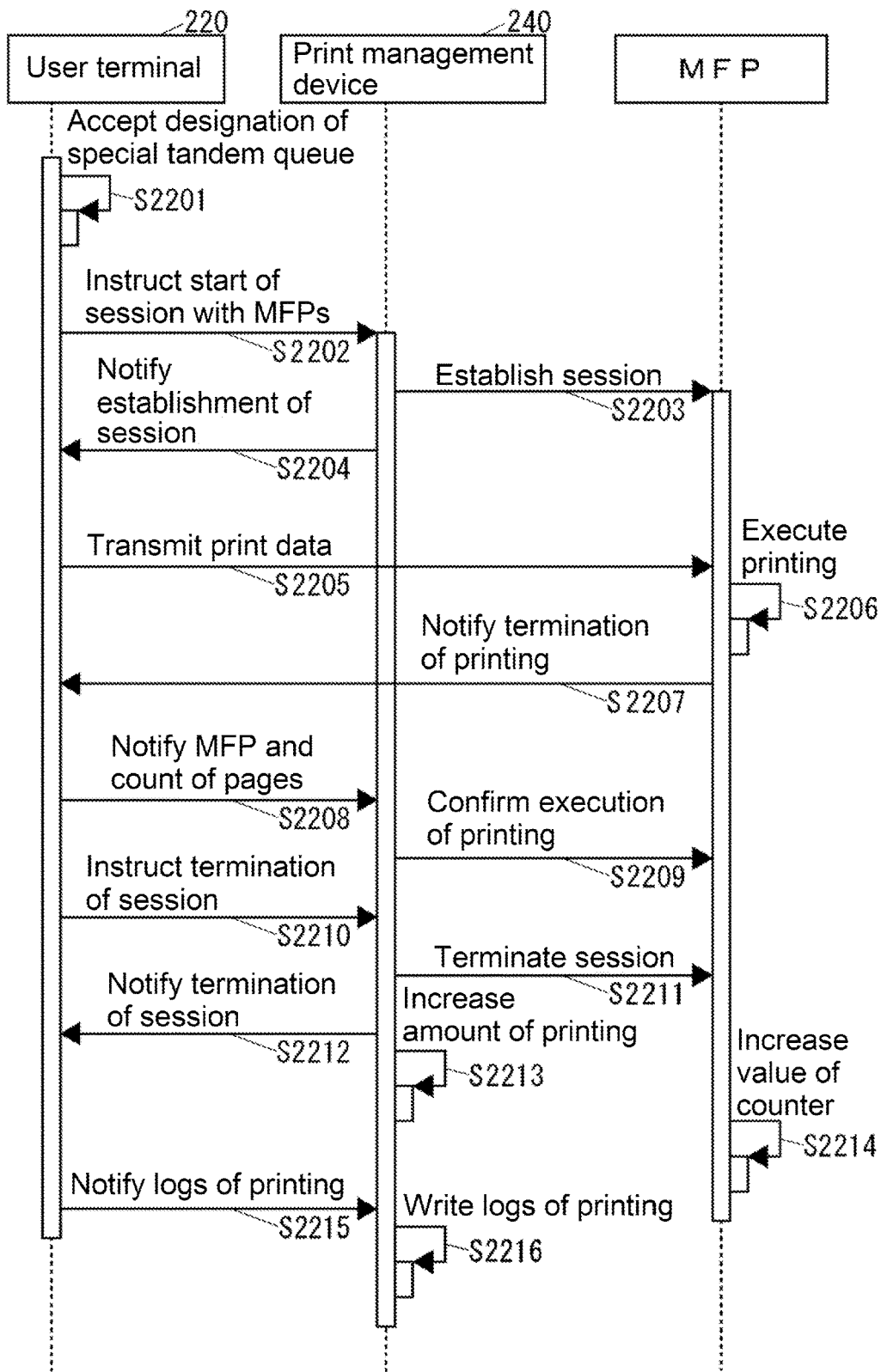
FIG. 21 shows a sequence diagram of operations of the printing system according to the second embodiment when a special tandem queue is designated in the queue list.

FIG. 21 illustrates the operations of the printing system 210 according to the second embodiment when the special tandem queue is designated in the queue list 251.

Pressing the designation button 252 while any one of the special tandem queues is selected in the queue list 251 on the queue list display screen 250, the designation accepting unit 225c in the user terminal 220 accepts the designation of the special tandem queue selected in the queue list 251 as illustrated in FIG. 21 (Step S2201).

Next, the session instructing unit 225d in the user terminal 220 instructs the print management device 240 to start a session with all MFPs related to the special tandem queue accepted at Step S2201, that is, all MFPs candidate for the transmission destination of the print data by the data transmitting unit 225b (Step S2202).

Accordingly, the session establishing unit 245i in the print management device 240 establishes the session instructed at Step S2202, that is, the session with all MFPs related to the special tandem queue accepted at Step S2201 in the queue management information 244c (Step S2203). While FIG. 21 illustrates only one MFP, when a plurality of MFPs are related to the special tandem queue accepted at Step S2201 in the queue management information 244c, the process at Step S2203 is performed on these all MFPs.

After the process at Step S2203, the session establishing unit 245i notifies the user terminal 220 of the establishment of the session instructed at Step S2202 (Step S2204).

When the establishment of the session is notified at Step S2204, the data transmitting unit 225b in the user terminal 220 transmits the print data created at Step S2109 to the most appropriate MFP among all MFPs related to the special tandem queue accepted at Step S2201 (Step S2205). Here, the most appropriate MFP is, for example, an MFP with a high possibility of the earliest termination of the performance of printing based on this print data among all MFPs related to this special tandem queue. The MFP with the high possibility of the earliest termination of the performance of printing is, for example, an MFP with the least count of print data standing by for performance of printing among all MFPs related to this special tandem queue. The data transmitting unit 225b may make an inquiry for information required to settle the most appropriate MFP to the MFP to acquire the information. While FIG. 21 illustrates only one MFP, when a plurality of MFPs are related to the special tandem queue accepted at Step S2201, the data transmitting unit 225b may assign and transmit the print data created at Step S2109 to the plurality of MFPs in units of pages.

When the print data is transmitted at Step S2205, the control unit in the MFP performs the printing by a printer based on the transmitted print data (Step S2206). When the printing performed at Step S2206 terminates, the control unit notifies the user terminal 220 of the termination of the printing (Step S2207).

Whenever the notification is received at Step S2207, the transmission notifying unit 225e in the user terminal 220 notifies the print management device 240 of a count of pages of the print data transmitted to the MFP and the MFP to which the print data has been transmitted (Step S2208).

Whenever the notification is received at Step S2208, the print confirming unit 245j in the print management device 240 makes an inquiry to this MFP to confirm that the printing by the count of pages notified at Step S2208 has been performed by the MFP notified at Step S2208 (Step S2209). This confirmation is performed through the session established at Step S2203.

When the termination of the printing of all pages in the print data created at Step S2109 based on the notification at Step S2207 is confirmed, the session instructing unit 225d in the user terminal 220 instructs the print management device 240 to terminate the session with all MFPs related to the special tandem queue accepted at Step S2201 (Step S2210).

Accordingly, the session establishing unit 245i in the print management device 240 terminates the session with all MFPs related to the special tandem queue accepted at Step S2201 in the queue management information 244c (Step S2211). While FIG. 21 illustrates only one MFP, when a plurality of MFPs are related to the special tandem queue accepted at Step S2201 in the queue management information 244c, the process at Step S2211 is performed on these all MFPs.

After the process at Step S2211, the session establishing unit 245i notifies the user terminal 220 of the termination of the session with all MFPs related to the special tandem queue accepted at Step S2201 (Step S2212).

When the session with all MFPs related to the special tandem queue accepted at Step S2201 terminates, the print amount managing unit 245g in the print management device 240 increases the amount of printing of the user identified by the authentication at Step S2103 in the print-permission amount management information 244e according to the amount of printing confirmed at Step S2209 (Step S2213). Here, after increasing the amount of printing, the print amount managing unit 245g also changes the print-permission amount by subtracting the amount of printing from the amount of print upper limit.

When the session established at Step S2203 terminates, the control unit in the MFP increases the value of the counter 37a according to the amount of printing performed at Step S2206 (Step S2214).

When the notification at Step S2212 is received, the data transmitting unit 225b in the user terminal 220 notifies the print management device 240 of the logs of the printing performed at Step S2206 (Step S2215).

Accordingly, the print log managing unit 245h in the print management device 240 writes the logs of printing notified at Step S2215 to the print log information 244f (Step S2216).

As described above, the printing system 210 notifies the print management device 240 of the transmission of the print data to the MFP from the user terminal 220 without via the print management device 240 by the user terminal 220 (Step S2208), performs the confirmation of the completion of printing based on this print data to the MFP by the print management device 240 (Step S2209), and manages the amount of printing by the print management device 240 based on this result of confirmation (Step S2213). Accordingly, the printing system 210 can manage the amount of printing to the printing by the MFP based on the print data that has reached from the user terminal 220 without via the print management device 240 by the print management device 240.

The printing system 210 instructs the print management device 240 to start the session with the MFP by the user terminal 220 (Step S2202), and after that confirms the completion of the printing based on the print data transmitted to the MFP from the user terminal 220 without via the print management device 240 in the session with the MFP by the print management device 240 (Step S2209). Accordingly, a possibility that the completion of the printing by the MFP is not confirmed by the print management device 240 can be lowered. Accordingly, the printing system 210 can appropriately manage the amount of printing to the printing by the MFP based on the print data that has reached from the user terminal 220 without via the print management device 240 by the print management device 240.

When the plurality of the MFPs are related to the special tandem queue, the printing system 210 can assign and transmit the print data to the plurality of MFPs related to the special tandem queue; therefore, the printing based on the print data can be efficiently performed.

Since the printing system 210 can perform the printing using the special tandem queue designated by the user among the plurality of special tandem queues, the convenience can be improved.

Since the printing system 210 transmits the print data suited for the print restrictions of the user who logs in from the user terminal 220 to the print management device 240 from the user terminal 220 to the MFP, the convenience can be improved.

Since the printing system 210 transmits the print data according to the print-permission amount of the user who logs in from the user terminal 220 to the print management device 240 from the user terminal 220 to the MFP, the convenience can be improved.

While the image forming apparatus of the disclosure is the MFP in each embodiment, an image forming apparatus other than the MFP, such as a printer-only machine, may be used.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A print management device comprising:
   a network communications unit for network-linked communications between the print management device and a plurality of printing apparatuses;
   a central processing unit (CPU); and
   a CPU-associated storage unit storing a print management program for execution by the CPU, the CPU executing the print management program thereby configuring the CPU as
   a print queue managing unit for managing print queues correlated with the plurality of printing apparatuses, wherein the print queue managing unit, when authentication of a user is instructed through any user terminal of a plurality of print-data transmitting user terminals, executes authentication of the user based on authentication information transmitted from the any user terminal and on user management information, and, based on a user ID for the user and on queue management information, the print queue managing unit generates, for all of print queues correlated with the user ID, a print queue list indicating queue ID, queue type, and printing apparatus ID correlated with the queue, and transmits the print queue list to the any user terminal,
   a wireless print control unit including
      a wireless communications unit for communicating with the print-data transmitting user terminals in a common wireless printing protocol, the wireless printing protocol not requiring a driver individually corresponding to the plurality of printing apparatuses, the wireless communications unit therein receiving print data transmitted from the user terminals,
      a queue notifying unit for transmitting to the any user terminal, via the wireless communications unit, the print queue list generated by the print queue managing unit, and
      a designation accepting unit for accepting from the any user terminal, via the wireless communications unit, a designated queue from the print queue list transmitted by the queue notifying unit,
   a data storage unit for storing the print data received by the wireless communications unit from the user terminals, in the designated queue accepted by the designation accepting unit, and
   a data transmitting unit for taking out the print data from the designated queue and transmitting the print data to that printing apparatus among the plurality of printing apparatuses that is correlated with the queue.

2. The print management device according to claim 1, further comprising:

a print restriction managing unit that manages print restrictions as restrictions on a print function to a user; wherein the data transmitting unit transmits print data suited for a print restriction of a user who logs in from the user terminal to the print management device, among the print restrictions managed by the print restriction managing unit.

3. The print management device according to claim 1, further comprising:

a print-permission amount managing unit that manages print-permission amounts as an amount of printing permitted to a user; wherein the data transmitting unit transmits print data according to a print-permission amount of a user who logs in from the user terminal to the print management device, among the print-permission amounts managed by the print-permission amount managing unit.

4. A printing system comprising:

a plurality of print-data transmitting user terminals;

a plurality of printing apparatuses enabled for performing printing based on user-terminal print data; and a print management device for managing print management information correlated with the printing apparatuses; wherein the user terminals each include a user-terminal central processing unit (CPU), and a user-terminal CPU-associated storage unit storing a print data transmission program for execution by the user-terminal CPU, the user-terminal CPU executing the print management program thereby configuring the user-terminal CPU as a data transmitting unit for bypassing the print management device to transmit user-terminal print data directly to a printing apparatus among the plurality of printing apparatuses that is correlated with print management information managed by the print management device, and a transmission notifying unit for notifying the print management device of transmission by the data transmitting unit of user-terminal print data to a user-terminal-designated, print-queue-correlated printing apparatus among the plurality of printing apparatuses; and the print management device includes a print-management-device CPU; and a print-management-device CPU-associated storage unit storing a print management program for execution by the print-management-device CPU, the print-management-device CPU executing the print management program thereby configuring the print-management-device CPU as a print queue managing unit for managing print queues correlated with the plurality of printing apparatuses, wherein the print queue managing unit, when authentication of a user is instructed through any user terminal of the plurality of user terminals, executes authentication of the user based on authentication information transmitted from the any user terminal and on user management information, and, based on a user ID for the user and on queue management information, the print queue managing unit generates, for all of print queues correlated with the user ID, a print queue list indicating queue ID, queue type, and printing apparatus ID correlated with the queue, and transmits the print queue list to the any user terminal, a print confirming unit for, when the transmission notifying unit notifies the print management device of transmission of user-terminal print data to a user-terminal-designated, print-queue-correlated printing apparatus among the plurality of printing apparatuses, performing confirmation with the user-terminal-designated, print-queue-correlated printing apparatus of completion of printing based on the user-terminal print data, and apparatus when the transmission of the print data to the image forming apparatus is notified from the user terminal, and a print amount managing unit for managing printing amount based on result of the confirmation by the print confirming unit.

5. The printing system according to claim 4, wherein:

the user terminal includes a session instructing unit that instructs the print management device to start a session with the image forming apparatus as a transmission destination of the print data by the data transmitting unit;

the print management device includes a session establishing unit that establishes the session instructed from the user terminal;

the data transmitting unit transmits the print data when the session instructed by the session instructing unit is established; and the print confirming unit performs the confirmation in the session established by the session establishing unit.

6. The printing system according to claim 4, wherein when the plurality of image forming apparatuses are related to the print management information, the data transmitting unit assigns and transmits the print data to the image forming apparatuses.

7. The printing system according to claim 4, wherein:

the user terminal includes a print management information notifying unit that notifies the print management information managed by the print management device, and a designation accepting unit that accepts any designation of the print management information notified by the print management information notifying unit; and the data transmitting unit transmits the print data to the image forming apparatus related to the print management information corresponding to the designation accepted by the designation accepting unit.

8. The printing system according to claim 4, wherein:

the print management device includes a print restriction managing unit that manages print restrictions as restrictions on a print function to a user; and the data transmitting unit transmits print data suited for a print restriction of a user who logs in from the user terminal to the print management device, among the print restrictions managed by the print restriction managing unit.

9. The printing system according to claim 4, wherein:

the print management device includes a print-permission amount managing unit that manages a print-permission amount as an amount of printing permitted to a user; and the data transmitting unit transmits print data according to a print-permission amount of a user who logs in from the user terminal to the print management device, among the print-permission amounts managed by the print-permission amount managing unit.

* * * * *